(12) United States Patent
Gaziel et al.

(10) Patent No.: US 9,432,722 B2
(45) Date of Patent: Aug. 30, 2016

(54) REDUCING INTERFERENCE OF AN OVERLAY WITH UNDERLYING CONTENT

(71) Applicant: COMIGO LTD., Yarkona (IL)

(72) Inventors: Yoav Gaziel, Tel-Aviv (IL); Menahem Lasser, Kohav-Yair (IL); Ronen Segal, Herzlia (IL)

(73) Assignee: COMIGO LTD., Yarkona (IL)

( * ) Notice: Subject to any disclaimer, the term of this patent is extended or adjusted under 35 U.S.C. 154(b) by 0 days.

(21) Appl. No.: 14/938,863

(22) Filed: Nov. 12, 2015

(65) Prior Publication Data

US 2016/0066024 A1 Mar. 3, 2016

Related U.S. Application Data

(63) Continuation of application No. PCT/IB2015/054507, filed on Jun. 15, 2015.

(60) Provisional application No. 62/027,798, filed on Jul. 23, 2014.

(51) Int. Cl.
*H04N 5/445* (2011.01)
*H04N 21/431* (2011.01)
(Continued)

(52) U.S. Cl.
CPC ...... *H04N 21/4316* (2013.01); *G06Q 30/0241* (2013.01); *H04N 5/262* (2013.01); *H04N 5/445* (2013.01); *H04N 21/4312* (2013.01); *H04N 21/4318* (2013.01); *H04N 21/4438* (2013.01); *H04N 2005/44521* (2013.01)

(58) Field of Classification Search
CPC ............... H04N 5/45; H04N 5/44513; H04N 5/44504; H04N 21/4316
USPC ....................................................... 348/564
See application file for complete search history.

(56) References Cited

U.S. PATENT DOCUMENTS 5,953,076 A 9/1999 Astle et al.
7,015,978 B2 3/2006 Jeffers et al.
(Continued)

FOREIGN PATENT DOCUMENTS

| KR | 10-2005-0018552 A | 2/2005 |
|---|---|---|
| KR | 10-2007-0090473 A | 9/2007 |
| KR | 10-2013-0055453 A | 5/2013 |
| WO | 0172040 A2 | 9/2001 |

OTHER PUBLICATIONS

International Search Report for PCT/IB2015/054507 dated Sep. 18, 2015.
(Continued)

*Primary Examiner* — Michael Lee
(74) *Attorney, Agent, or Firm* — Marc Van Dyke; Fourth Dimension IP

(57) ABSTRACT

Methods and apparatus for displaying an overlay on top of media content are disclosed herein. In some embodiments, a request for presentation of an overlay on top of the media content at a target position on the display screen is handled (e.g. by a local terminal) in accordance with a dynamically determined extent of interference caused by the overlay to the media content. In some embodiments, a modification to at least one overlay attribute of the overlay is computed in accordance with the determined extent of interference, and the modified overlay is display over the underlying media content. Examples of 'overlay attributes' include size, color, transparency and shape.

25 Claims, 24 Drawing Sheets

(51) Int. Cl.
*G06Q 30/02* (2012.01)
*H04N 5/262* (2006.01)
*H04N 21/443* (2011.01)

(56) References Cited

U.S. PATENT DOCUMENTS

| | | | |
|---|---|---|---|
| 7,206,029 B2* | 4/2007 | Cohen-Solal | H04N 5/45 345/629 |
| 8,369,686 B2 | 2/2013 | Mei et al. | |
| 8,451,380 B2 | 5/2013 | Zalewski | |
| 2002/0070957 A1* | 6/2002 | Trajkovic | H04N 9/64 715/719 |
| 2011/0012812 A1 | 1/2011 | Onda et al. | |
| 2011/0178854 A1 | 7/2011 | Sofer et al. | |
| 2011/0188836 A1 | 8/2011 | Popkiewicz et al. | |
| 2011/0321084 A1 | 12/2011 | Takahashi et al. | |
| 2013/0061262 A1 | 3/2013 | Briggs et al. | |
| 2013/0227622 A1 | 8/2013 | Landow et al. | |
| 2014/0333833 A1* | 11/2014 | Mountain | H04N 5/44513 348/468 |

OTHER PUBLICATIONS

Written Opinion for PCT/IB2015/054507 dated Sep. 18, 2015.
KR 10-2013-0055453 Machine Translation (by EPO and Google)—published May 28, 2013; Lee In Young.
KR 10-2005-0018552 Machine Translation (by EPO and Google)—published Feb. 23, 2005; The Hack Co. Ltd.
KR 10-2007-0090473 Machine Translation (by EPO and Google)—published Sep. 6, 2007; Calltogether Inc.

* cited by examiner

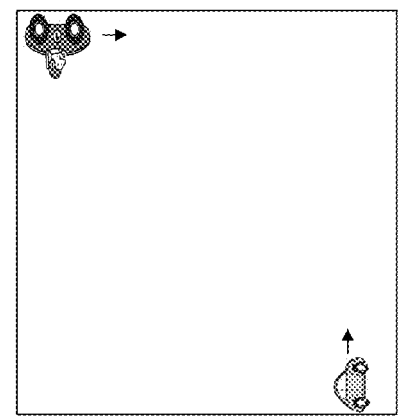
FRAME 1
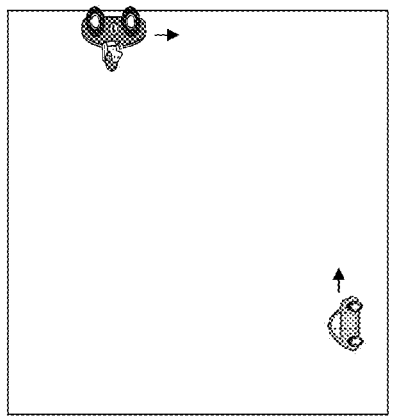
FRAME 2
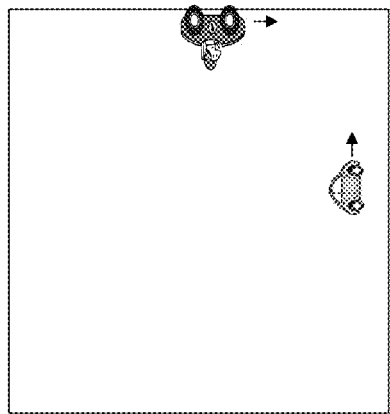
FRAME 3
PRIOR ART
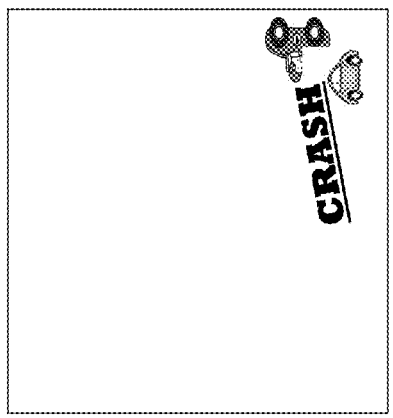
FRAME 4
FIG. 1A

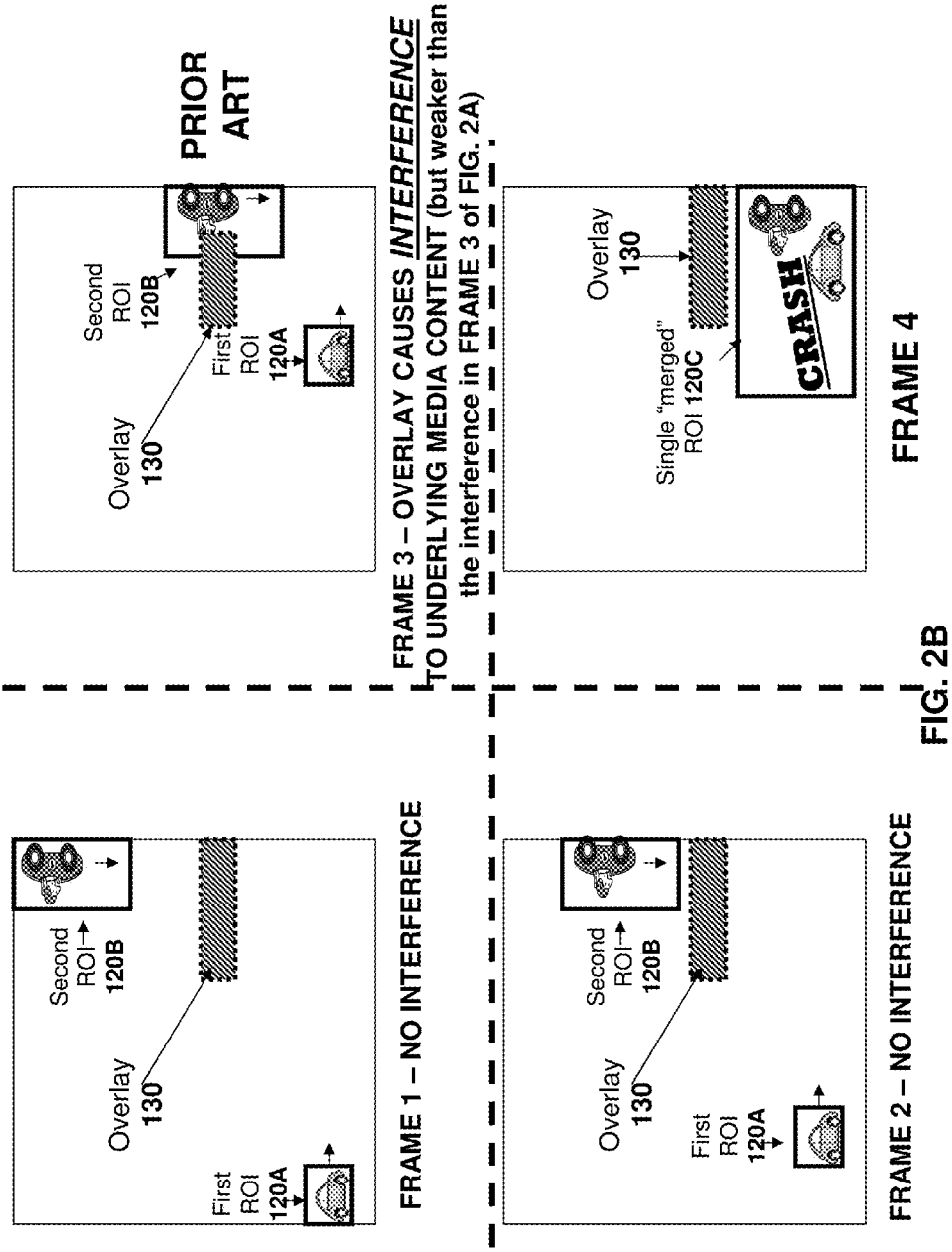

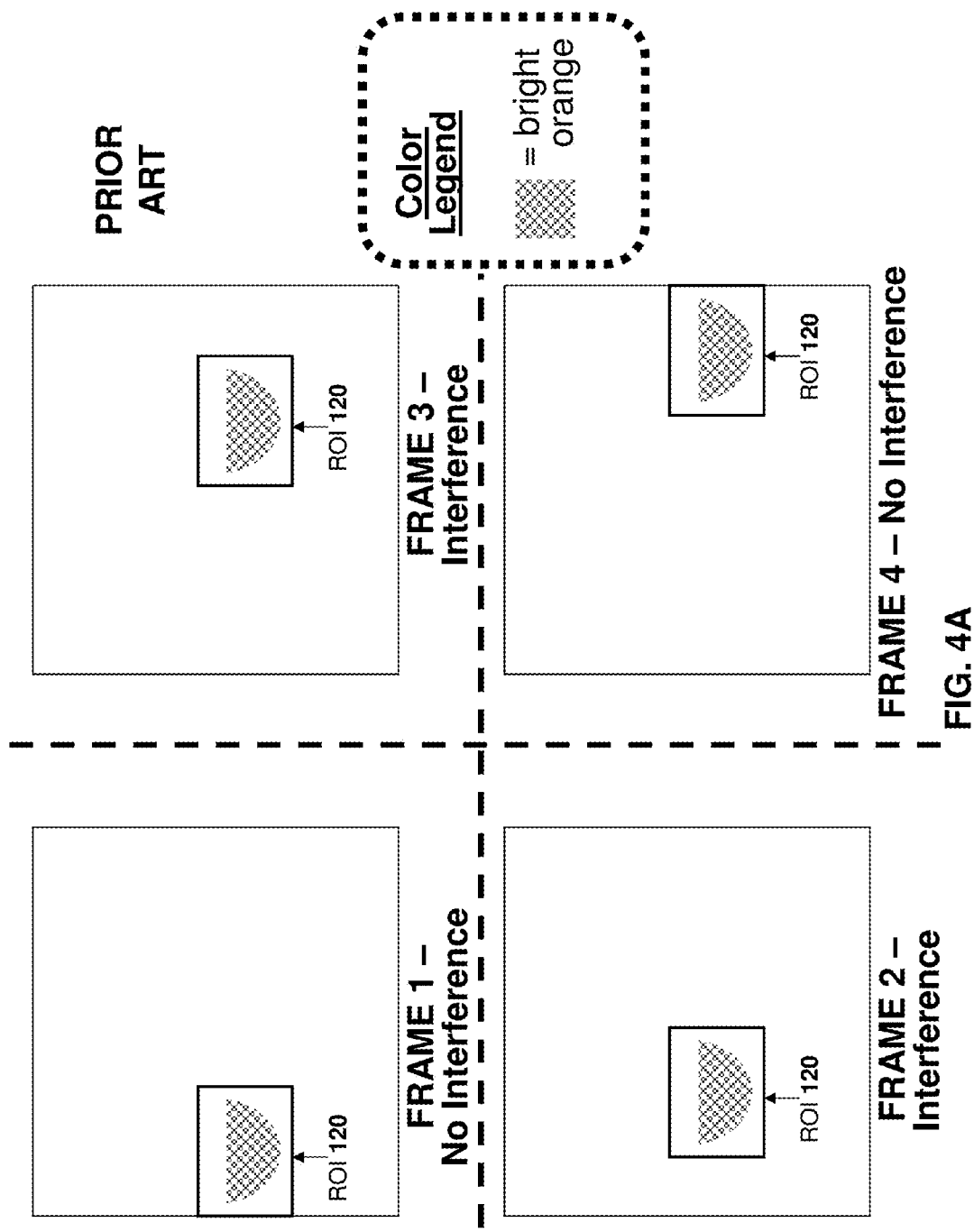

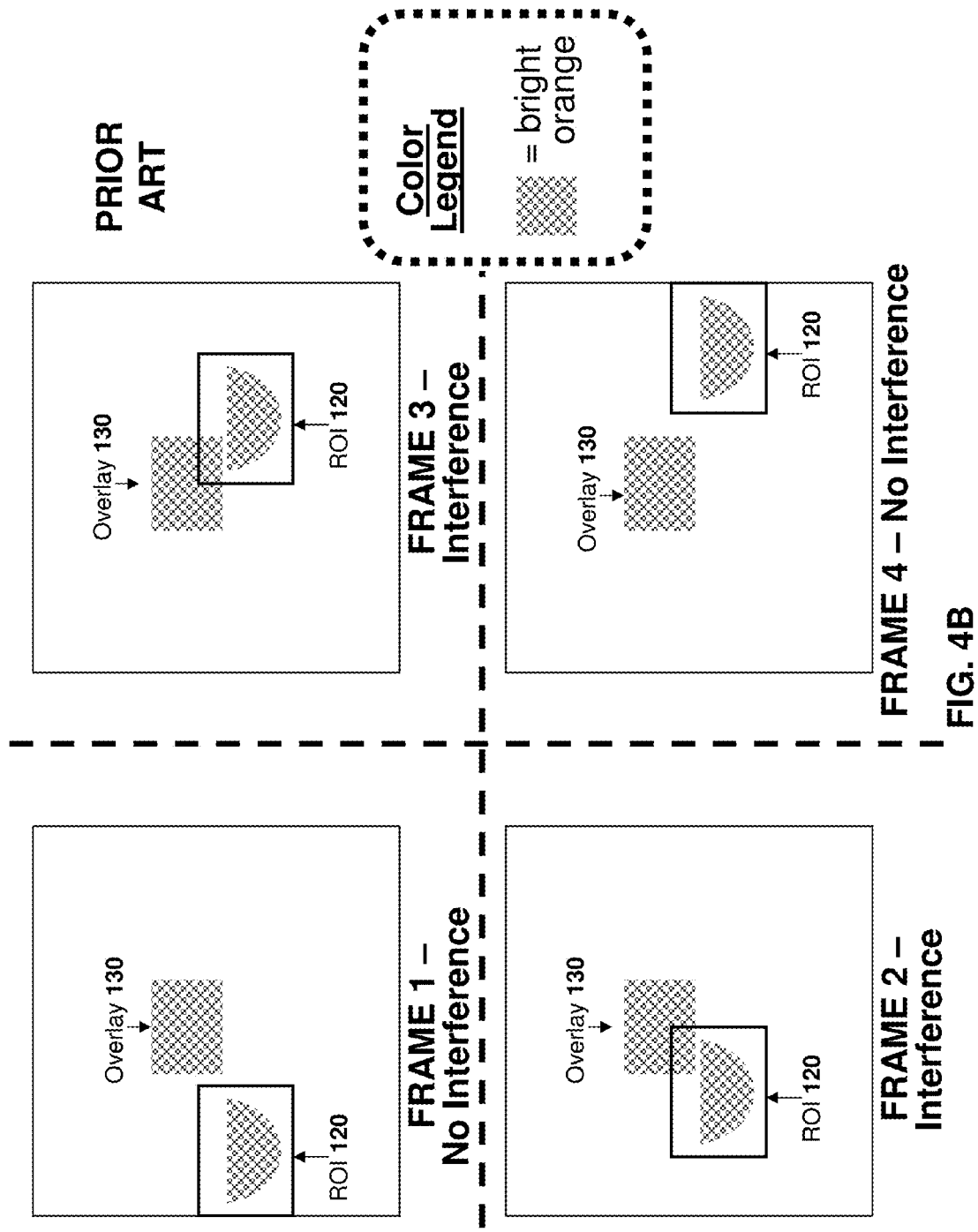

FRAME 1 – "WEAK" INTERFERENCE
FRAME 2 – "STRONG" INTERFERENCE
FRAME 3 – "WEAK" INTERFERENCE
PRIOR ART
FRAME 4 - NO INTERFERENCE
FIG. 5

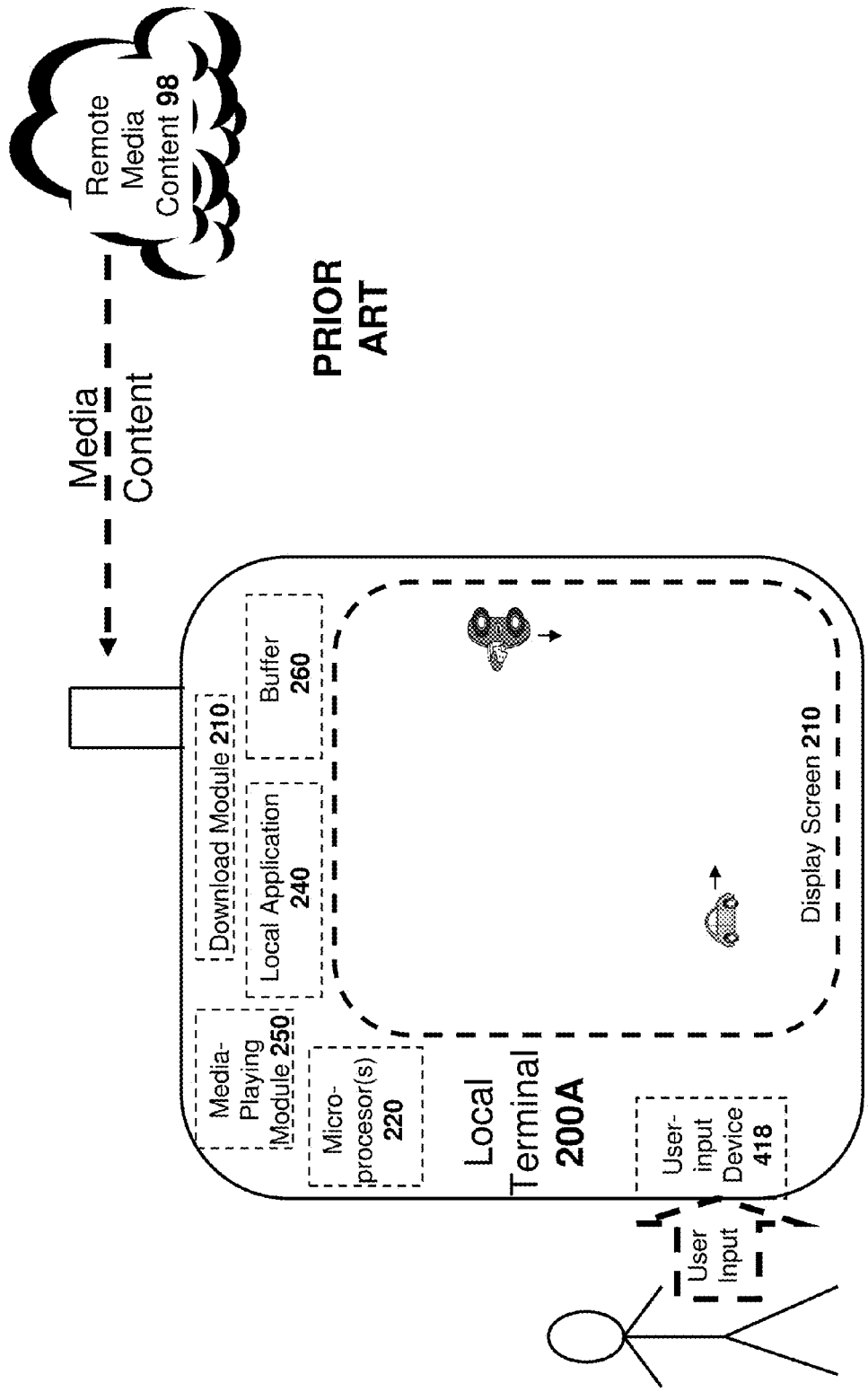

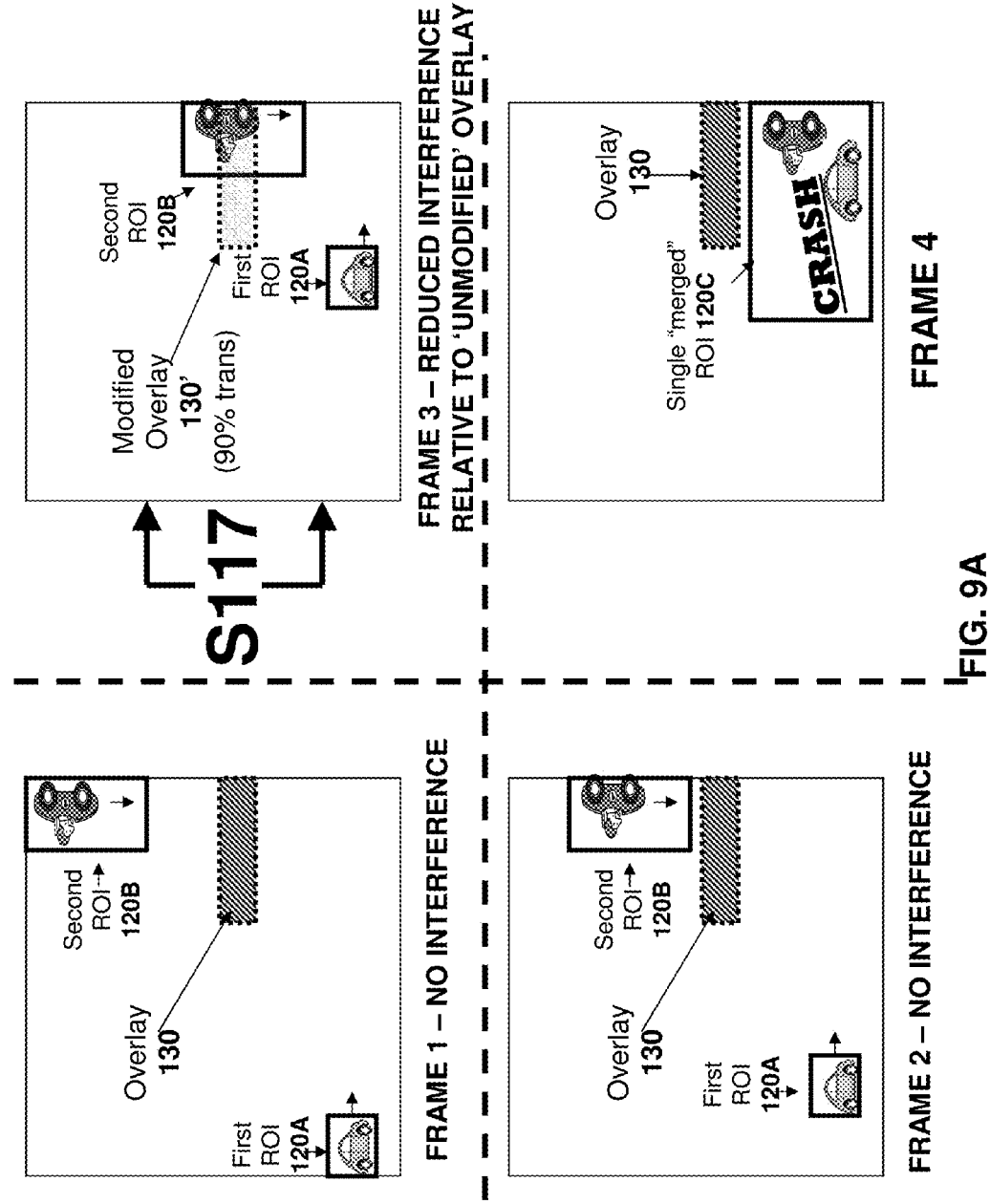

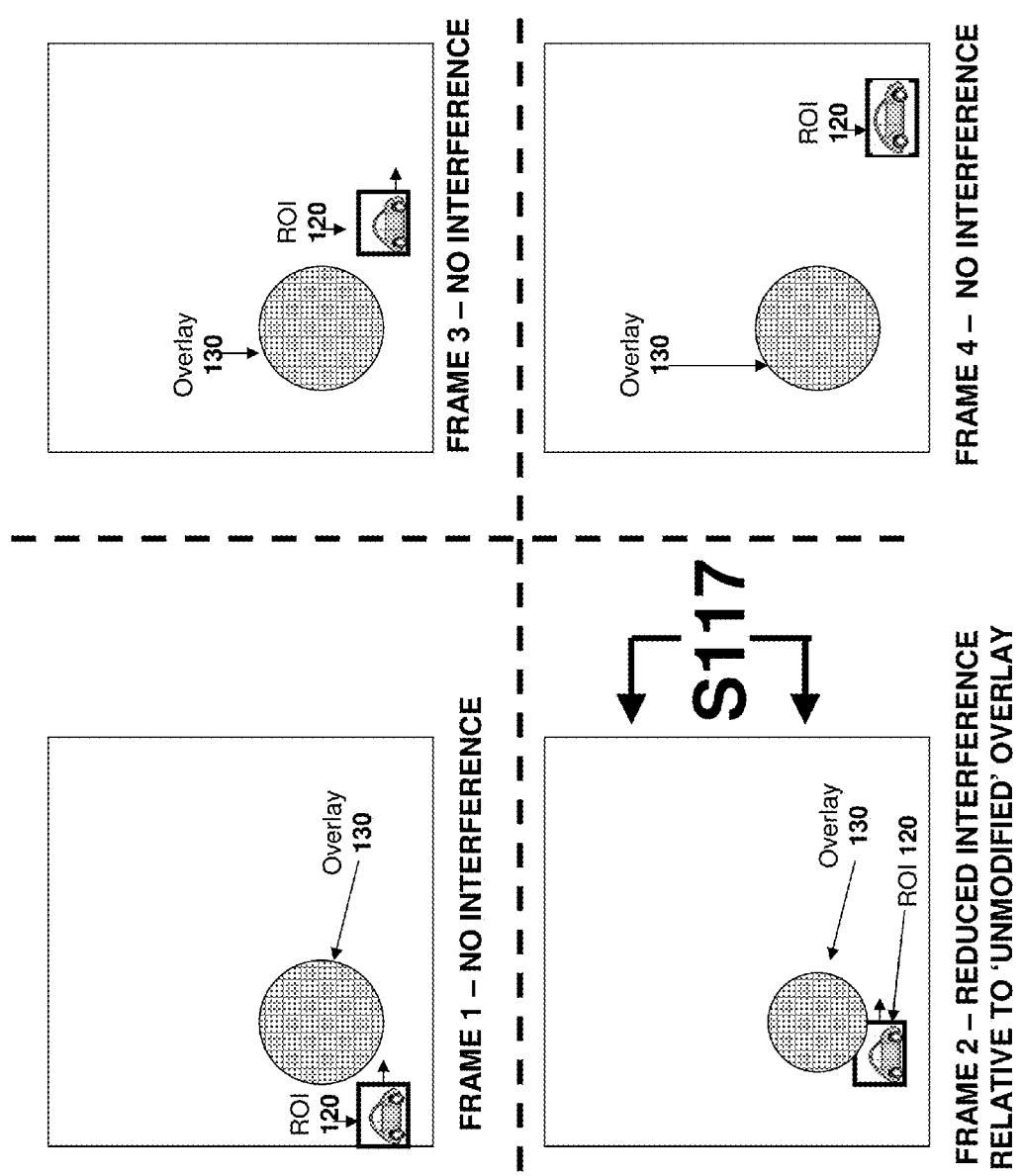

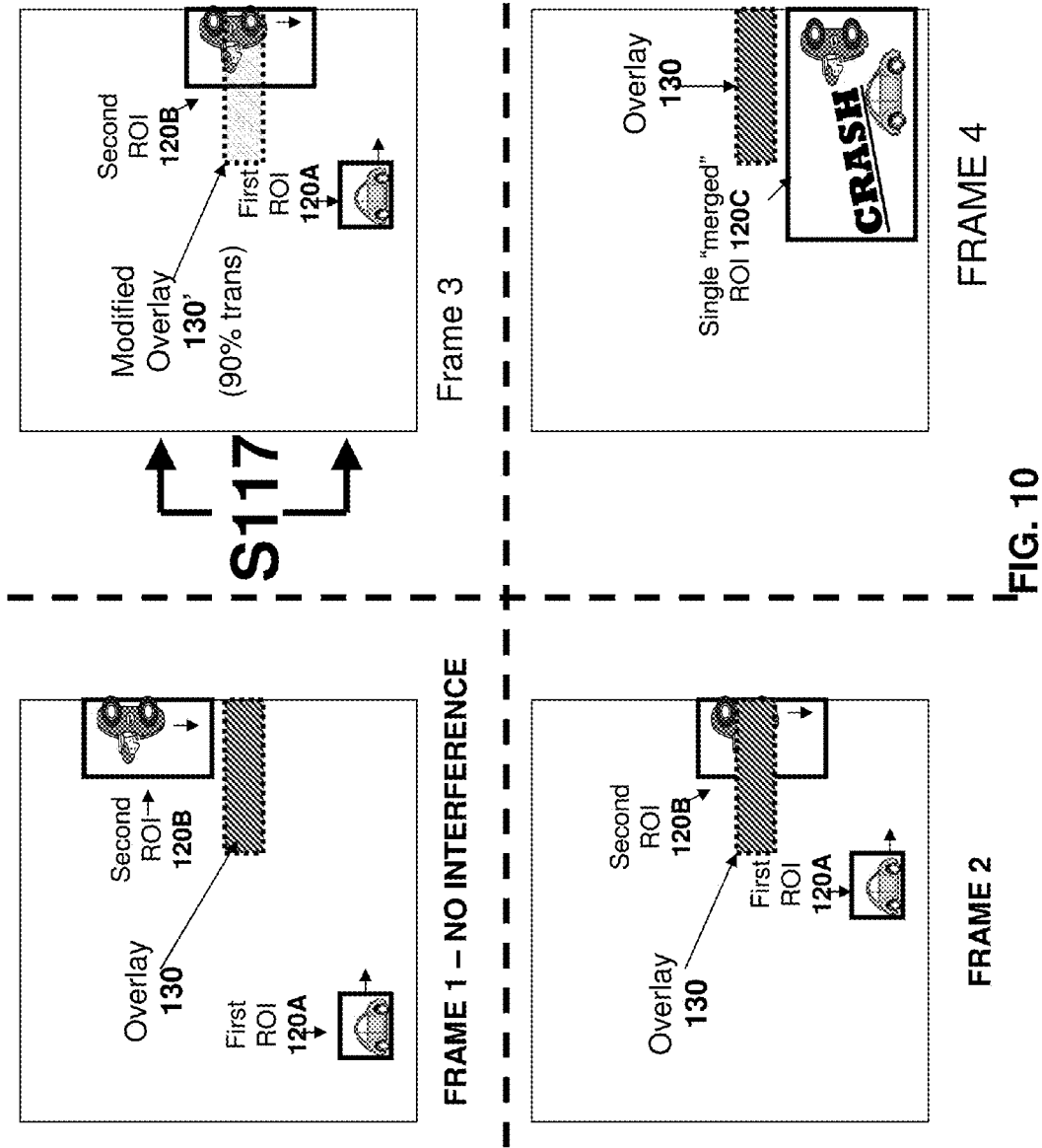

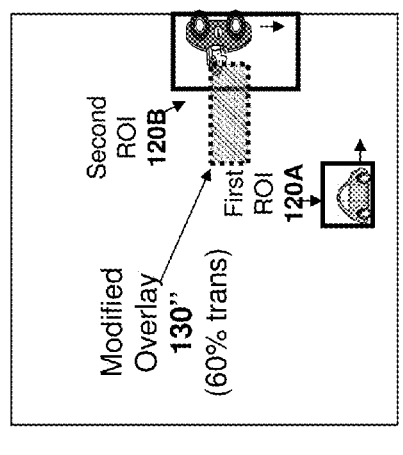
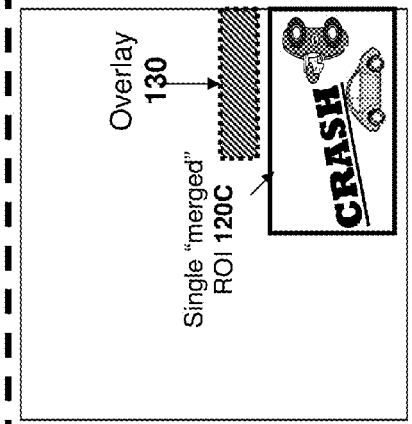
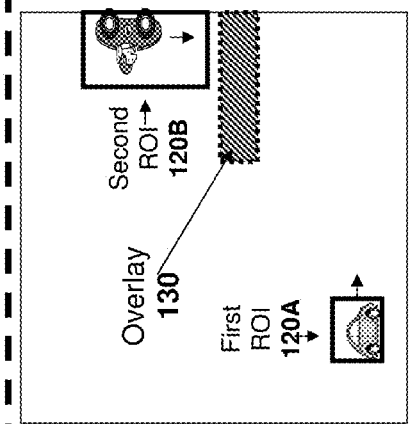
FIG. 12

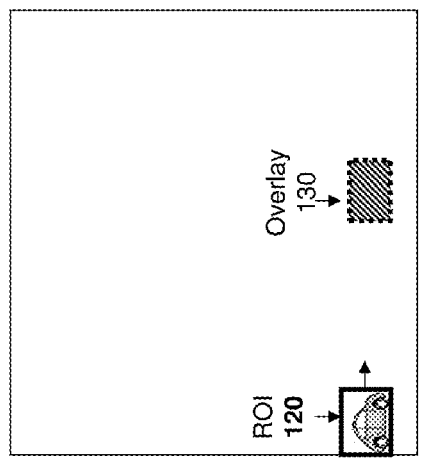
FRAME 1
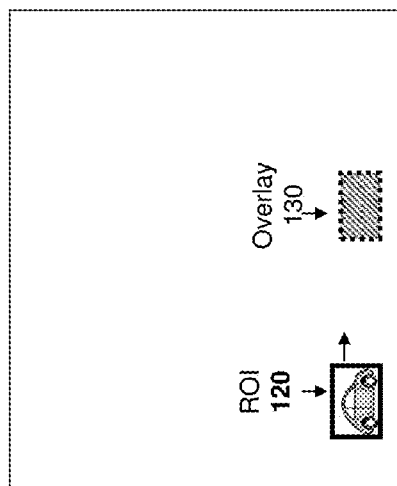
FRAME 2
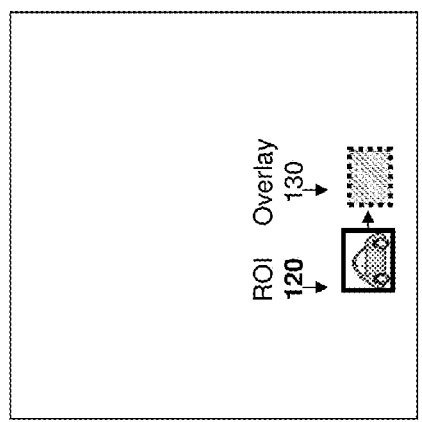
FRAME 3
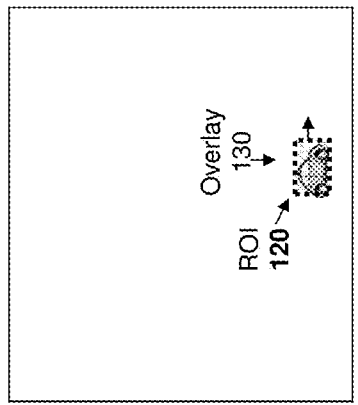
FRAME 4
FIG. 16B

REDUCING INTERFERENCE OF AN OVERLAY WITH UNDERLYING CONTENT

CROSS-REFERENCE TO RELATED APPLICATIONS

This patent application is a continuation of PCT/IB2015/054507 which was filed on Jun. 15, 2015 and which is incorporated herein by reference in its entirety. PCT/IB2015/054507 claims the benefit of U.S. Provisional Patent Application No. 62/027,798, filed on Jul. 23, 2014, which is incorporated herein by reference in its entirety.

BACKGROUND AND RELATED ART

Overlays Displayed on Top of Media Content

It is a common practice today that when users are viewing media content on their screens at their homes, there are multiple types of overlays displayed on top of the media content they want to watch.

The overlays may be advertisements trying to sell goods or services, which may or may not be related to the contents of the currently presented media. The overlays may be elements of a graphical user interface (GUI) such as pop-up control windows containing buttons the user may activate for selecting viewing modes. The overlays may be subtitles presenting translation of spoken text into a language different from a movie's original language. It is not uncommon to have multiple overlays of different types being simultaneously presented in different screen locations.

When viewing media content such as a movie or a sport competition like football or basketball game there are regions on the screen which are of relatively higher interest to the user than the rest of the screen. For example, the heads of the actors speaking in a movie scene have a high interest level. The same is true of a region in which the ball is currently located in a ball game.

It may happen that an overlay being displayed on top of the media content creates an interference with the media content by fully or partially hiding a region of interest. This might be very disturbing and frustrating to the user. A user might even get so irritated with such interference that he will develop negative feelings against an item advertised in the overlay, an effect that defeats the purpose of presenting the advertisement.

FIGS. 1A-1B each illustrate video content comprising four frames—in the example of FIGS. 1A-1B two cars move towards a corner of the screen (bottom, right corner) where, upon meeting a 'crash' is illustrated.

Algorithms are known in the art to electronically detect one or more 'region(s) of interest' (ROI) within a frame of media content. In the non-limiting example of FIGS. 1A-1B, two regions (respectively labeled as 120A and 120B) may be identified as 'regions of interest.' In video media content the ROIs may move—thus, as shown in FIGS. 1A-1B, first ROI 120A moves horizontally across the screen from left to right and the second ROI 120B moves vertically across the screen from top to bottom. The ROIs merge in "Frame 4" where there is a single merged ROI 120C.

FIG. 2A illustrates interference caused by the overlay to the video content. In Frames 1, 2 and 4 there is no such interference. In frame 3 of FIG. 2A, there is overlap between overlay 130 and second ROI 120B such that the overlay 130 blocks at least a portion of the second ROI 120B.

FIG. 2B is another example. Frames 1, 2 and 4 of FIG. 2B are respectively identical to Frames 1, 2 and 4 of FIG. 2A. Frame 3 of FIG. 2B illustrates interference caused by the overlay 130 to the media content within the second ROI 120B. Thus, in both FIG. 2A and FIG. 2B the overlay causes interference—however, the 'extent' of interference in Frame 3 of FIG. 2B is less than the extent of interference in Frame 3 of FIG. 2A.

FIG. 3 illustrates another example of interference by another overlay 130 (in this example a circular overlay) to underlying video content. In the example of FIG. 3, there is no interference in Frames 1, 3 and 4. In contrast, in Frame 3 of FIG. 3, circular overlay 130 causes 'significant' interference to the underlying content.

FIG. 4A illustrates frames of another video content item. In FIG. 4A, a semi-circular object moves horizontally from left to right. Also illustrated in FIG. 4A is ROI 120 which moves together with the semi-circle. In the example of FIG. 4A, the semi-circle is bright orange (see 'Color Legend' on the right hand side of FIG. 4A).

FIG. 4B is the same as FIG. 4A except for the presence of bright-orange overlay 130 in FIG. 4B. Although overlay 130 does not 'block' the semi-circle, it is noted that (i) in all frames, overlay 130 and the semi-circle have the same color, (ii) in Frames 2-3, the lower horizontal edge of rectangular overlay 130 is extremely close to the upper horizontal edge of the semi-circle. In Frames 2-3, the combination of matching colors and the proximity of the horizontal edge means that the presence of the overlay makes it more difficult for a viewer to detect the upper horizontal edge of the semi-circle.

Reference is now made to FIG. 5. As illustrated in FIG. 5, it is noted that for video content, the amount of 'interference' can increase or decrease as the video content evolves. In the example of FIG. 5, the extent of interference increases between Frame 1 and Frame 2, decreases between Frame 2 and Frame 3, and decreases between Frame 3 and Frame 4.

As illustrated in FIG. 6 which also relates to video media content (see Frames 1-4), it is possible for underlying media content to have multiple ROIs 120A, 120B and/or multiple overlays 130A, 130B. In frames 1 and 4, there is no interference. In Frame 2 first overlay 130A causes interference to media content in ROI 120A; in Frame 3 second overlay 130B causes interference to media content in ROI 120B.

U.S. Pat. No. 8,451,380 and US Patent Application No. 2011/0188836, each of which is incorporated by reference in its entirety, each disclose changing the screen positions of interfering overlays and also disclose algorithms for distinguishing between safe and unsafe locations for the overlays.

The prior art solution presented above may indeed reduce the level of interference created by overlays, but it has a significant drawback. What the user sees during the time interval in which an overlay such as a GUI window is displayed is a window jumping around the screen as the regions of interest in the background media content evolve with time. It might be very difficult for the user to select a button (for example using a cursor controlled by a mouse) when the button seems to be "running away" from the cursor as it gets close to it. This might be a frustrating experience for the user.

But even with overlays that do not require user input such as simple advertisements the experience of the overlay randomly shifting around might still be frustrating. There is thus a need for a solution that solves the overlay interference problem without suffering from this disturbing effect.

Local Terminals

FIG. 7A illustrates a local terminal 200A (e.g. a mobile phone, a laptop, a desktop, etc) configured to display media content (e.g. remote media content 98 downloaded into local terminal 200A by download module 210) on display screen 210.

Local terminal 200A includes a media-playing module 250 (e.g. comprising a CODEC for decoding content item 98 or a portion thereof—for example, a hardware media decoder) for playing media content, a microprocessor(s) 220 for executing code of local application 240 and a user input device 418.

For local terminals that download their content, a portion of the content (e.g. one or more video frames of video content) may be stored in buffer 260—by storing video frames in buffer 260, these frames are immediately available for display irrespective of the rate of download of media content.

Another example of a local terminal 200B is illustrated in FIG. 7B. Instead of, or in addition to, having an 'onboard display screen 210' (as in the example of FIG. 7A), a local terminal may export a visual-content signal (e.g. video signal) via respective ports 280, 310 to an external rendering device 300 so that visual content is displayed on screen 320.

The following issued patents and patent publications provide potentially relevant background material, and are all incorporated by reference in their entirety: U.S. Pat. Nos. 5,953,076, 7,015,978, 8,369,686, 8,451,380, US20110188836 US20110178854, US20110012812, US2013227622 and WO2001072040

SUMMARY

A method of displaying an overlay on top of video content comprises: a. commencing presentation of video content on a display screen associated with a local terminal; and b. subsequently and during the continued presentation of the video content, handling a request for presentation of an overlay on top of the video content at a target position on the display screen by performing the following steps: (i) subsequent to the local terminal receiving and/or generating the request to present the overlay and in accordance with the target position, dynamically determining, by the local terminal, an extent of interference caused by the overlay to the video content; (ii) in accordance with the determined extent of interference, computing, by the local terminal, a modification of at least one overlay attribute of the overlay; and (iii) displaying the overlay on top of the video content by the local terminal, wherein the overlay is modified according to the computed modification.

A video-display device comprises: a. at least one display element selected from a group consisting of a display screen and a device port configured to export a video signal; and b. electronic circuitry configured: i. to commence presentation of video content by displaying the video content on the display screen and/or exporting the video signal corresponding to the video content via the device port; and ii. to handle request for presentation of an overlay on top of the video content at a target position on the display screen by performing the following steps: A. in response to the request to present the overlay and in accordance with the target position, dynamically determining, by the local terminal, an extent of interference caused by the overlay to the video content; B. in accordance with the determined extent of interference, computing a modification of at least one overlay attribute of the overlay; and C. displaying the overlay on top of the video content, wherein the overlay is modified according to the computed modification.

A method of displaying an overlay on top of media content, the method comprises: a. commencing presentation of the media content on a display screen associated with a local terminal; and b. subsequently and during the continued presentation of the media content, handling a request for presentation of an overlay on top of the media content at a target position on the display screen by performing the following steps: i. subsequent to the local terminal receiving and/or generating the request to present the overlay and in accordance with the target position, dynamically determining, by the local terminal, an extent of interference caused by the overlay to the media content; ii. in accordance with the determined extent of interference, computing, by the local terminal, a modification of at least one overlay attribute of the overlay; and iii. displaying the overlay on top of the media content by the local terminal, wherein the overlay is modified according to the computed modification.

In some embodiments, the media content is video content (for example, motion picture video or motion graphics).

In some embodiments, the media content is still graphics or still photography.

A display device comprises: a. at least one display element selected from a group consisting of a display screen and a device port configured to export a display signal; and b. electronic circuitry configured: i. to commence presentation of media content by displaying the media content on the display screen and/or exporting the display signal corresponding to the media content via the device port; and ii. to handle request for presentation of an overlay on top of the media content at a target position on the display screen by performing the following steps: A. in response to the request to present the overlay and in accordance with the target position, dynamically determining, by the local terminal, an extent of interference caused by the overlay to the media content; B. in accordance with the determined extent of interference, computing a modification of at least one overlay attribute of the overlay; and C. displaying the overlay on top of the media content, wherein the overlay is modified according to the computed modification.

In some embodiments, the dynamic determining is performed by the local terminal in response to the request to present the overlay.

In some embodiments, the request to present the overlay is locally generated at the local terminal. For example, the request to present the overlay may be locally generated in response to an 'overlay-triggering event' which occurs during the 'continued presentation' of the video content. One example of an 'overlay-triggering event' is receipt of user input by the local terminal. Another example of an 'overlay-triggering event' is the onboard clock of the local terminal indicating that it is now a specific time.

In some embodiments, the request to present the overlay is remotely received by the local terminal from a remote computer. In one example, the overlay is remotely generated and the request to present the overlay is only generated by and/or received by the local terminal during the 'continued presentation' of the content. In another example, the overlay is locally generated but the 'target location' is only received into the local terminal from an outside location (e.g. remote computer) during the 'continued presentation' of the content.

In some embodiments, the determining of the extent of the interference comprises determining whether the extent of the interference requires the modification of the at least one overlay attribute.

In some embodiments, the video content is remote content and the commencing of the presentation occurs when the video content is only partially downloaded to the local terminal.

In some embodiments, the video content is remote content and the overlay is locally generated at the local terminal.

In some embodiments, the video content is remote content and the overlay is remotely generated and downloaded to the local terminal.

In some embodiments, the video content is remote content, the method further comprises: c. subsequent to the displaying of the overlay according to the computed modification, downloading additional frames of the video content to the local terminal; d. in response to the downloading of the additional frames and in accordance with the target position, dynamically determining, by the local terminal, a second extent of interference caused by the overlay to the additional frames of the video content; e. in accordance with the second determined extent of interference, computing, by the local terminal, a second modification of at least one overlay attribute of the overlay, said second modification being different from the first modification; and f. displaying the overlay on top of the video content by the local terminal, wherein the overlay is modified according to the second computed modification.

In some embodiments, the overlay retains at least one of its size, color, shape and transparency.

In some embodiments, only a single attribute of the overlay is modified.

In some embodiments, the computed modification modifies at least a color of at least a portion of the overlay.

In some embodiments, the computed modification modifies at least a transparency level of at least a portion of the overlay.

In some embodiments, the computed modification modifies at least a size of the overlay.

In some embodiments, the computed modification modifies at least a shape of the overlay.

In some embodiments, the determining of the extent of the interference and the computing of the modification of the overlay are performed by electronic circuitry sharing a common housing with the display screen.

In some embodiments, the determining of the extent of the interference and the computing of the modification of the overlay are performed by electronic circuitry that is housed in a housing separate from a housing that houses the display screen. In one example, the housing of the electronic circuitry is housing of a 'set-top box.' In another example, the housing is housing of a portable media player (PMP) including a port which mechanically mates with a port of a rendering device to which the PMP exports a video signal. The PMP-exported video signal is presented on a display screen of the rendering device.

In some embodiments, an interference caused by the modified overlay to the video content is less than the interference caused by the unmodified overlay to the video content.

In some embodiments, the modification is computed so that the greater the extent of the interference and/or the higher the interest-grade assigned to the portion of the underlying media content behind the overlay, the greater the modification to the overlay.

In some embodiments, a different respective modification is respectively made to the displayed overlay for each frame of a plurality of video frames of the video content.

In some embodiments, the overlay is displayed for one or more earlier frames with no modification and in response to a detection of a change in interference with respect to later frames, a modification to the overlay is computed.

In some embodiments, in response to a user dragging of the overlay over non-uniform underlying media content, (for example, the overlay is a GUI widget) updated attribute(s) modifications of the overlay attributes are repeatedly computed and applied to the displayed overlay according to an instant location of the overlay and according to non-uniformities on the background media content.

In some embodiments, in response to a user dragging the overlay over the underlying media content, a modification of the overlay is computed and applied to the overlay.

In some embodiments, the method further comprises periodically refreshing the modification to the overlay attribute according to changes in the media content. Examples of this are discussed below—see, for example, FIG. 13.

In different embodiments, the overlay may be an advertisement or an element of a graphical user interface or a subtitle.

The media content may be motion picture video or motion graphics or still graphics.

In some embodiments, a modified overlay attribute may have a predefined set of multiple available values and modifying of the attribute may be implemented by selecting one of the predefined values. For example, a set of 'transparency values' (e.g. 25%, 50%, 75%) may be stored in computer memory—one of the transparency values may be selected according to the extent of the interference.

In other embodiments, the modified overlay attribute may be settable to any value between a lower limit and an upper limit, and modifying of the attribute may be implemented by calculating a value that falls between the lower limit and the upper limit.

In some embodiments, the determination if displaying the overlay in the given overlay position on the screen will create an interference with the background media content is implemented by dynamically calculating screen coordinates of at least one region of interest in at least one frame.

In some embodiments the dynamically determining of the extent of interference caused by the overlay to the video content comprises identifying a region of interest within the media content and the extent of the interference is determined in accordance with a spatial relation between the region of interest and the target position of the overlay.

In some embodiments, determining if displaying the overlay in the given overlay position on the screen will create an interference with the media content is implemented by receiving pre-calculated screen coordinates of at least one region of interest in at least one frame and dynamically determining if there is an interference between the overlay and the at least one region of interest.

In some embodiments, a different respective modification is respectively made to the displayed overlay for each frame of a plurality of video frames of the video content according to frame-specific interference respectively computed for each frame.

In some embodiments, a first version of the overlay (i.e. according to a first modification of overlay attributes) is displayed over early frames of the video content and in response to computing interference between the overlay and later frames of the video content, a modification to the first version is computed (i.e. modification of overlay attribute) and the modified version is displayed on top of later frames of the video content.

In some embodiments, i. for each given overlay of a plurality of non-contiguous overlays, a respective request for presentation is handled, ii. for each given overlay of the overlay plurality, a respective extent of interference caused by the overlay to the underlying video content (for example, in a respective portion of the screen occupied by the given overlay) is dynamically determined; and iii. in accordance with the determined extents of interference, each overlay of the plurality is differentially modified and displayed so that (i) a different overlay-specific modification is computed for each given overlay; (ii) each given overlay is modified according to its respective overlay-specific modification and respectively displayed.

In some embodiments, the modification non-uniformly changes, in accordance with the determined extent of interference, the transparency of the overlay.

In some embodiments, the modification of the overlay comprises subjecting the overlay to a transparency modification function that is spatially non-uniform.

In some embodiments, the modification subjects the overlay to a non-uniform color-transformation function, in accordance with the determined extent of interference.

In some embodiments, the modification of the overlay comprises subjecting the overlay to a color-modification function that is spatially non-uniform.

In some embodiments, the modification non-uniformly changes the transparency of the overlay in accordance with at least one of: (i) an estimated non-uniformity in user-interest within a portion of the screen occupied by the overlay; (ii) non-uniformity in visual properties of the overlay and/or underlying media content within a portion of the screen occupied by the overlay.

In some embodiments, the modification subjects the overlay to a non-uniform color-transformation function in accordance with at least one of: (i) an estimated non-uniformity in user-interest within a portion of the screen occupied by the overlay; (ii) non-uniformity in visual properties of the overlay and/or underlying media content within a portion of the screen occupied by the overlay.

In some embodiments, the method is performed without modifying the underlying media (e.g. video) content—e.g. there is no modification of the underlying media (e.g. video) content by the local terminal.

In different embodiments, the method is performed without modifying the underlying media (e.g. video) content. For example, by relying on modification(s) of the overlay rather than the underlying media (e.g. video) content, it is possible to reduce interference.

In some embodiments, the overlay is subjected to a transformation function which treats textual content and non-textual content differently. For example, it is possible to increase the transparency of non-textual portions of the overlay to 90% and to increase the transparency of locations in the overlay where text appears to only 60%. In this example, it might be decided that overlay text is 'important' to justify greater interference at text locations.

In some embodiments, the modification of the overlay is computed so as to minimize changes to the overlay for an acceptable level of interference. More about this is presented in the discussion below with reference to FIG. 12 and FIG. 9A.

In some embodiments, in response to a detection of color interference, the modification of the overlay attributes includes darkening the overlay or a portion thereof. More about this is presented in the discussion below with reference to FIG. 15.

In some embodiments, in response to a detection of color interference, the modification of the overlay attributes includes darkening the overlay or a portion thereof so as to increase a contrast between the overlay and pixels of the underlying media content. More about this is presented in the discussion below with reference to FIG. 15. A method of displaying an overlay on top of video content comprises: a. commencing presentation of video content on a display screen associated with a local terminal; and b. subsequently and during the continued presentation of the video content: i. performing a first display operation by displaying the overlay on top of the underlying video content at an earlier time; ii. dynamically analyzing content of each given frame of a set of frames of the video to dynamically detect or predict, for each given frame, a respective extent of interference caused by the overlay to the given frame; and iii. responding to an actual or predicted temporal change in the extent of interference attributable to the evolving of the underlying video content in time by: A. computing a modification of at least one overlay attribute of the overlay; and B. performing a second display operation, at a later time, by displaying the overlay on top of the video content by the local terminal such that the overlay is modified according to the computed modification.

In some embodiments, i. in response to a detected or predicted increase in interference attributable to the evolving of the underlying video content at an earlier time, the transparency of the displayed overlay is increased and/or the size of the overlay is reduced; and ii. in response to a detected or predicted subsequent decrease in interference attributable to the evolving of the underlying video content at a later time, the transparency of the displayed overlay is subsequently decreased and/or the size of the displayed overlay is subsequently increased.

BRIEF DESCRIPTION OF THE DRAWINGS

FIGS. 1A-1B and 4A illustrate video content without on overlay displayed on top of the video content (PRIOR ART).

FIGS. 2A-2B, 3, 4B, and 5-6 illustrate video content with on overlay displayed on top of the video content (PRIOR ART).

FIG. 7A-7B illustrate local terminal (PRIOR ART).

FIGS. 9A-9D, 10, 12-15 and 16A-16B illustrate video content including a dynamically-modified overlay(s) according to some embodiments.

DETAILED DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed methods, apparatuses, and computer readable media having stored thereon computer code for logical protocol command disambiguation is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

Embodiments of the invention relate to methods and apparatus for on-the-fly local modification of an overlay to reduce interference caused by the overlay to underlying media content. According to some embodiments, after the local terminal has commenced displaying the underlying media content, the local terminal handles a request to present the overlay by (i) dynamically determining an extent of interference caused by the overlay to the media content; and (ii) if the amount of interference exceeds a 'tolerable' amount of interference (e.g. defined by 'threshold'), the local terminal modifies the overlay and displays the modified overlay instead of the 'original overlay' specified by the 'request to present the overlay.'

Figure 8:
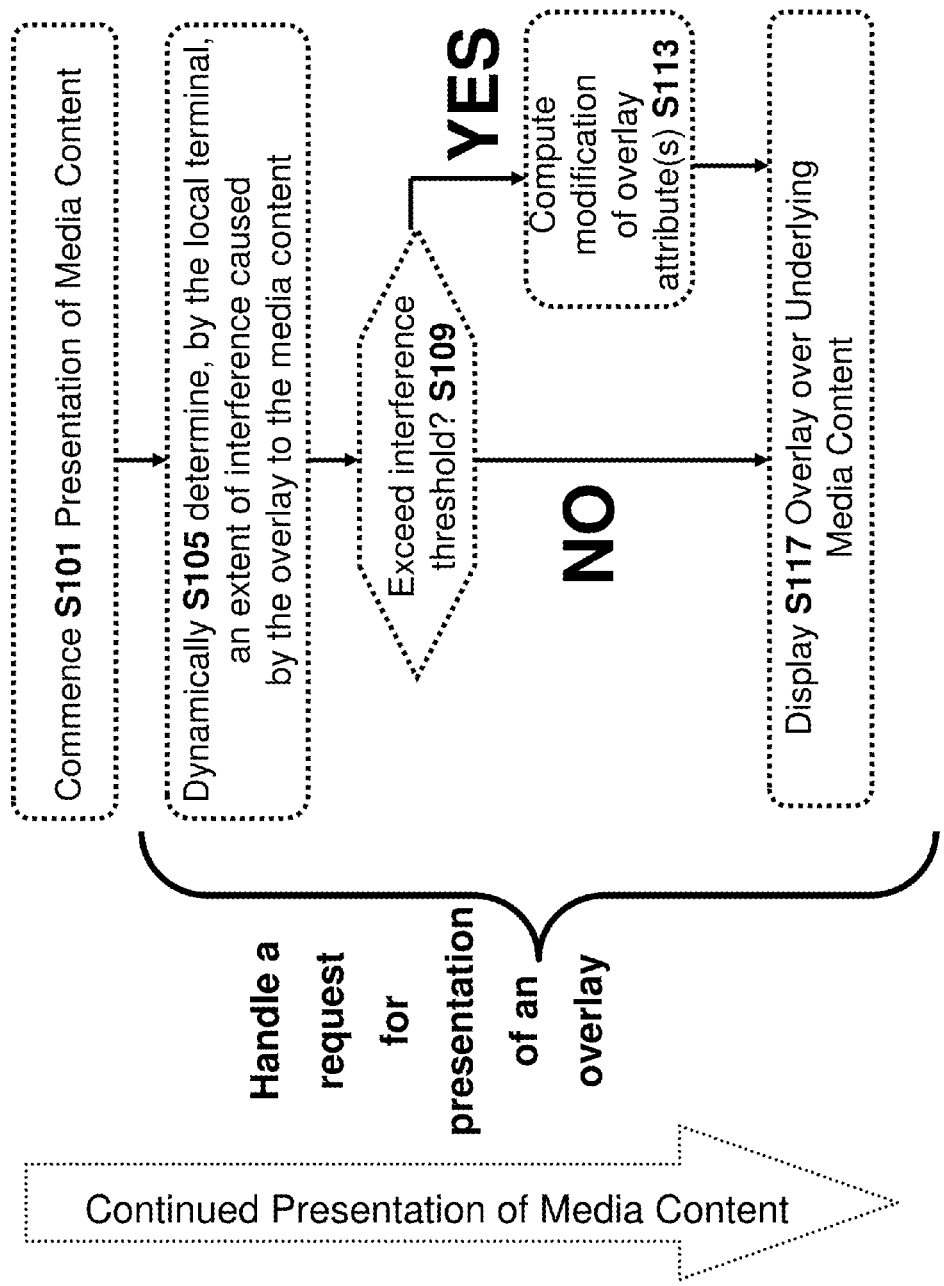
FIGS. 8 and 11 are flow charts explaining a method for displaying an overlay over video content according to some embodiments of the invention.

FIG. 8 which presents a flow chart of a method for displaying an overlay on top of underlying media content, is discussed below (after the discussion of the 'four examples' and after the 'definitions' section).

Four Examples of Overlay Attributes

A first example of an overlay attribute is the size of an overlay. A chat overlay window may have multiple predefined sizes—for example one full-size view that is displayed when there is no interference and displays a first number of text lines, and another half-size view that is displayed when there is interference and displays a second number of text lines that is smaller than the first number. The user terminal generating the displayed picture makes the determination which of the two sizes to use at the current time according to a determination whether an interference exists or not. The number of available sizes does not need to be two—it may be any integer number larger than one.

Another example of changing the size attribute uses continuous size scaling instead of a fixed-size list of predefined sizes. When an interference is detected the user terminal determines the preferred factor by which the overlay size should be reduced so as to reduce the level of interference while still keeping it meaningful to the user. Techniques for shrinking an image to a smaller size while preserving its visual contents are well known in the art and may be used here.

FIG. 9B, which presents an example where a size attribute of an overlay is modified, is discussed below (after the 'definitions' section).

A second example of an overlay attribute is the shape of an overlay. A GUI window containing buttons may have multiple predefined shapes—for example one shape that displays the buttons as a vertical column, and another shape that displays the buttons as a horizontal row. The user terminal generating the displayed picture makes the determination which of the two sizes to use at the current time according to a determination which of the shapes intersects with an identified region of interest. The number of available shapes does not need to be two—it may be any integer number larger than one.

Figure 9C:
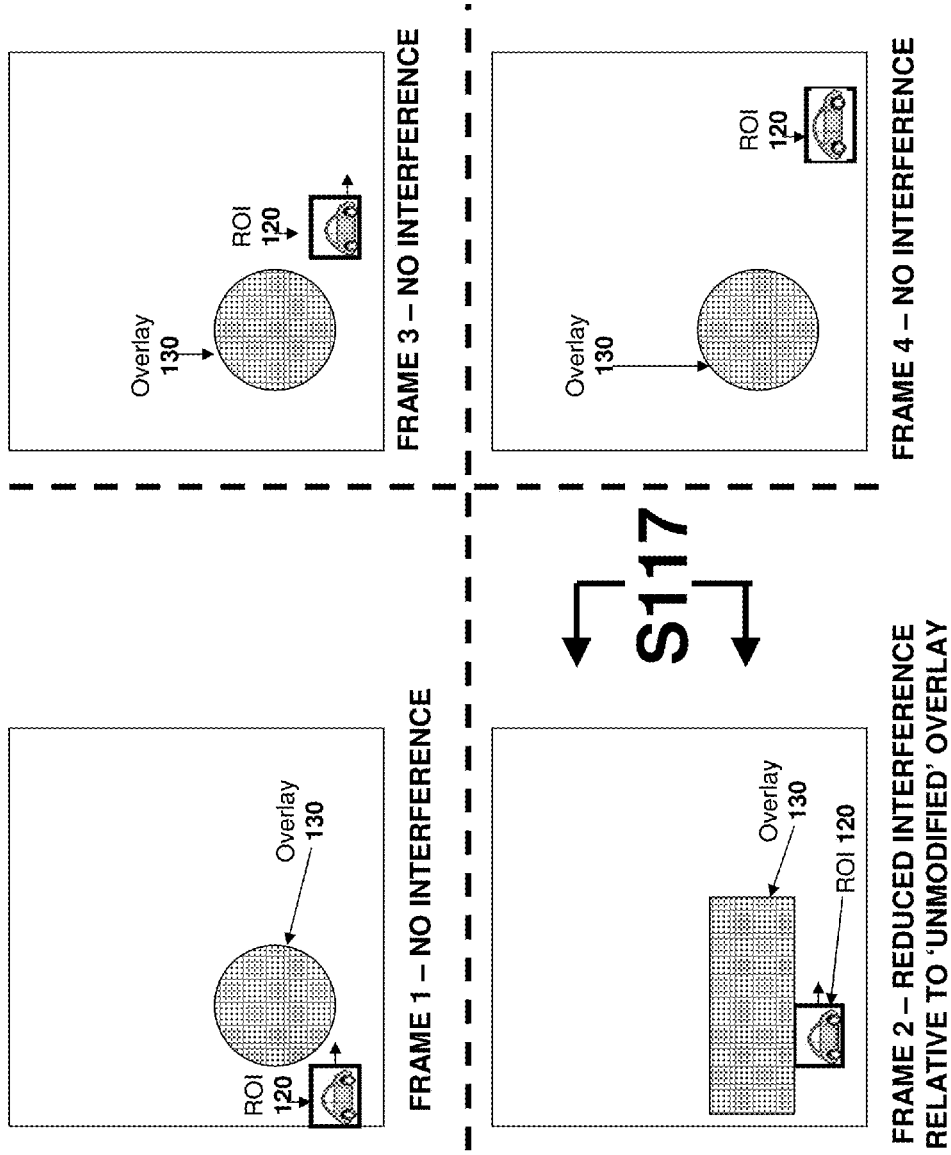

FIG. 9C, which presents an example where a shape attribute of an overlay is modified, is discussed below (after the 'definitions' section).

A third example of an overlay attribute is the transparency level of an overlay. An information overlay window displaying statistics of a basketball player during a game may have multiple predefined transparency levels—for example one level which is fully opaque with no transparency that is to be used when there is no interference, and another transparency level which is mid-scale and lets the media content partially be seen behind the overlay. The user terminal generating the displayed picture makes the determination which of the two transparency levels to use at the current time according to a determination whether an interference exists or not. The number of available transparency levels does not need to be two—it may be any integer number larger than one.

As in the case of the size attribute, the changing of the transparency level attribute may use a continuous scale instead of a fixed-size list of predefined levels. When an interference is detected the user terminal determines the preferred transparency level to be applied to the overlay so as to reduce the level of interference to a desired level. Techniques for applying a desired transparency level to an overlay are well known in the art and may be used here.

FIG. 9A, which presents an example where a transparency attribute of an overlay is modified, is discussed below (after the 'definitions' section).

A fourth example of an overlay attribute is the color of an overlay. A subtitles overlay displaying a translation of spoken text over a movie may have multiple predefined colors—for example one default text color that is to be used when there is no color interference between the subtitles and the media content behind them, and another text color that is to be used when there is color interference with the default color so that the contrast of the overlaid text over its background is retained and the text can be read by the user.

It is also possible to change multiple attributes at the same time—for example using a first size, a first shape, a first transparency level and a first color when there is no interference, and using a second size, a second shape, a second transparency level and a second color when there is an interference. It is also possible to combine the presently proposed solution with the prior art solution, changing both one or few overlay attributes and the overlay location at the same time.

Figure 9D:
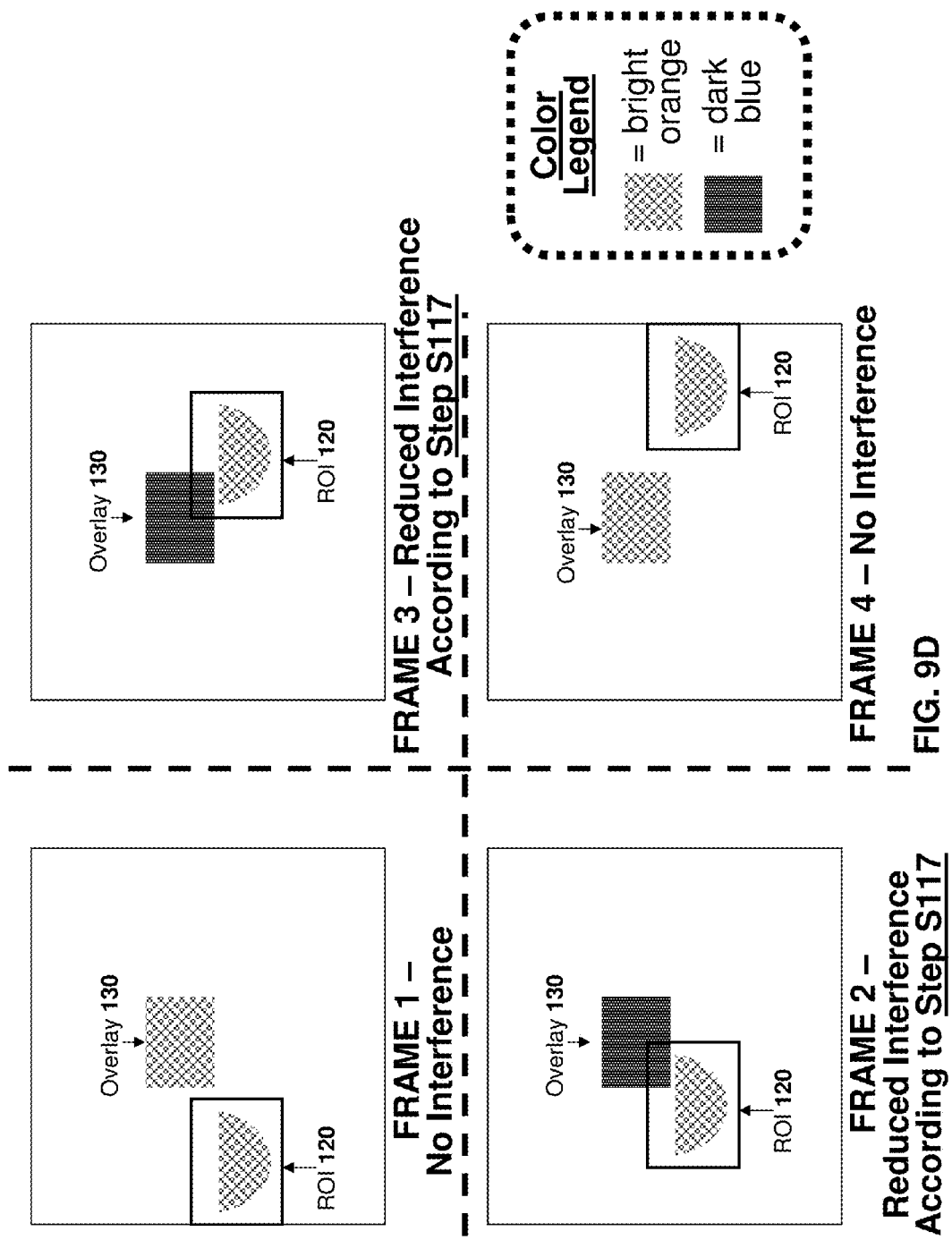

FIG. 9D, which presents an example where a color attribute of an overlay is modified, is discussed below (after the 'definitions' section).

Presently disclosed methods may by performed so as to reduce the interference caused by the overlay to the underlying media content, thereby obviating the need to continually move the overlay in response to evolving background media content (e.g. video content).

In one embodiment, the presently-disclosed techniques may replace these prior-art techniques and a location of the overlay is not moved according to dynamically-detected interference. In other embodiments, any presently-disclosed technique may be combined with any prior art technique.

DEFINITIONS

Within this application the following terms should be understood to have the following meaning:

"media content"—Visual content displayable on a user's display screen. Examples of types of media content are video content (e.g. motion picture video, motion graphics) and static images (e.g. photographs or still graphics). Media content also includes any combination or mixture of different types of media content.

"motion picture video"—Video content generated by a camera. Examples of types of motion picture video are streaming video and video generated at a user's site from a file.

"motion graphics"—Graphical content generated by a processor, in which the image changes between some or all of the displayed frames. Animations are a special case of motion graphics. Examples of types of motion graphics are streaming graphics and graphics generated at a user's site from a file.

"video content"—motion picture video, motion graphics or any combination thereof. In addition, any combination of video content with any type of media content is also considered video content.

"overlay"—Visual content displayable on a user's screen on top of other media content. An overlay may have dimensions that are smaller than the full screen. An overlay may have any shape, including circular, elliptical or rectangular of any orientation. Examples of types of overlays are motion picture video, motion graphics and still graphics. Overlays also include any combination or mixture of different types of overlays. Examples of uses of overlays are an advertisement, an element of a graphical user interface and subtitles presenting translations of spoken text. By definition an overlay is "on top" of the content—i.e. the overlay is in the 'foreground' and the content is in the 'background.' The overlay may hide the content but the content never hides the overlay. When content and overlay are both visible, it is only when the overlay (or a portion thereof) is made partially or entirely transparent.

"displaying an overlay"—displaying either an original overlay or a modified overlay.

"region of interest" (ROI)—A region of a screen which displays media content that is estimated to have a 'high' level of interest to the user—for example, according to some interest 'threshold' where 'high' means exceeding the threshold. By definition, a 'region of interest' is not the entire screen but only a subsection thereof. A region of interest may have any shape. A screen may contain multiple regions of interest at the same time. The locations, shapes, sizes and number of regions of interest may dynamically change during the time interval of displaying an item of media content according to the images presented on the screen. Examples of regions of interest are a region showing the basket during a basketball game or a region showing the head of a main character of a movie while he is talking. A region of interest may have an interest grade assigned to it, where the grade is a numerical value indicating a relative level of interest of the region compared to other regions. Not every portion of a video frame (or static media content) is required to be within a 'region of interest'—the video frame (or static media content) may include 'non-interest' region(s) (where according to some threshold it is determined that user interest does not exceed the threshold) that are outside of every 'region of interest.'

"interference"—An instance of an overlay displayed over a region of interest—this occurs when the overlay intersects with a 'region of interest'. Additionally, interference also includes the special case of color interference.

"extent of interference"—a relative measure of the severity of the visual disturbance caused by an interference. The extent of interference may depend on the amount of overlap between the overlay causing the interference and the intersecting region of interest, on the transparency level of the overlay, on the color contrast between the overlay and the region of interest, and on other factors also affecting the visual perception of a user looking at the region of interest while the overlay is displayed. The extent of interference of an overlay may have a "zero value" of "no interference", for example when there is no overlap between the overlay and every region of interest of the underlying video frame (or static media content).

The term "determining an extent of interference caused by an overlay to content" refers to determining the extent of interference caused by the overlay to any region of interest in the content image, if any. The term also includes as special cases a determination that there is no interference at all, a determination that the extent of interference is low so that the resulting visual disturbance should be ignored, and a determination that the extent of interference is high so that the resulting visual disturbance should be reduced, without producing a numerical measure.

In some embodiments, "an extent of interference caused by an overlay to content" refers to 'current interference' and the term "determining an extent of interference caused by an overlay to content" refers to detecting current interference.

In some embodiments, "an extent of interference caused by an overlay to content" refers to 'future interference' and the term "determining an extent of interference caused by an overlay to content" refers to predicting future interference.

"color interference"—An instance of an overlay displayed over a region of the screen such that the colors of the overlay and the region are close to each other to the extent they lack enough contrast to make the overlay and/or the underlying media content easily visible.

"overlay position"—The location on a user's screen where an overlay is displayed. The location may be specified as screen coordinates of a centroid of the overlay, screen coordinates of a given corner of the overlay, screen coordinates of a clearly identified point in the overlay, and the like. A 'target position' of an overlay is the overlay position where it is desired to display it.

"overlay attribute"—an intrinsic attribute of an overlay that may be changed to create a visual effect. Examples of overlay attributes are the overlay's size, the overlay's shape, the overlay's transparency level and the overlay's color. A screen position of an overlay is not considered an intrinsic attribute and consequently is not an overlay attribute.

"frame"—a single image that is displayed during one refresh cycle of a screen.

"dynamically determining"—making a determination (for example, in real time) while the media content is being displayed. This contrasts with "offline determining" in which the determination is done in advance of displaying the media content.

"Electronic circuitry" may include any software/executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture.

Figure 7B:
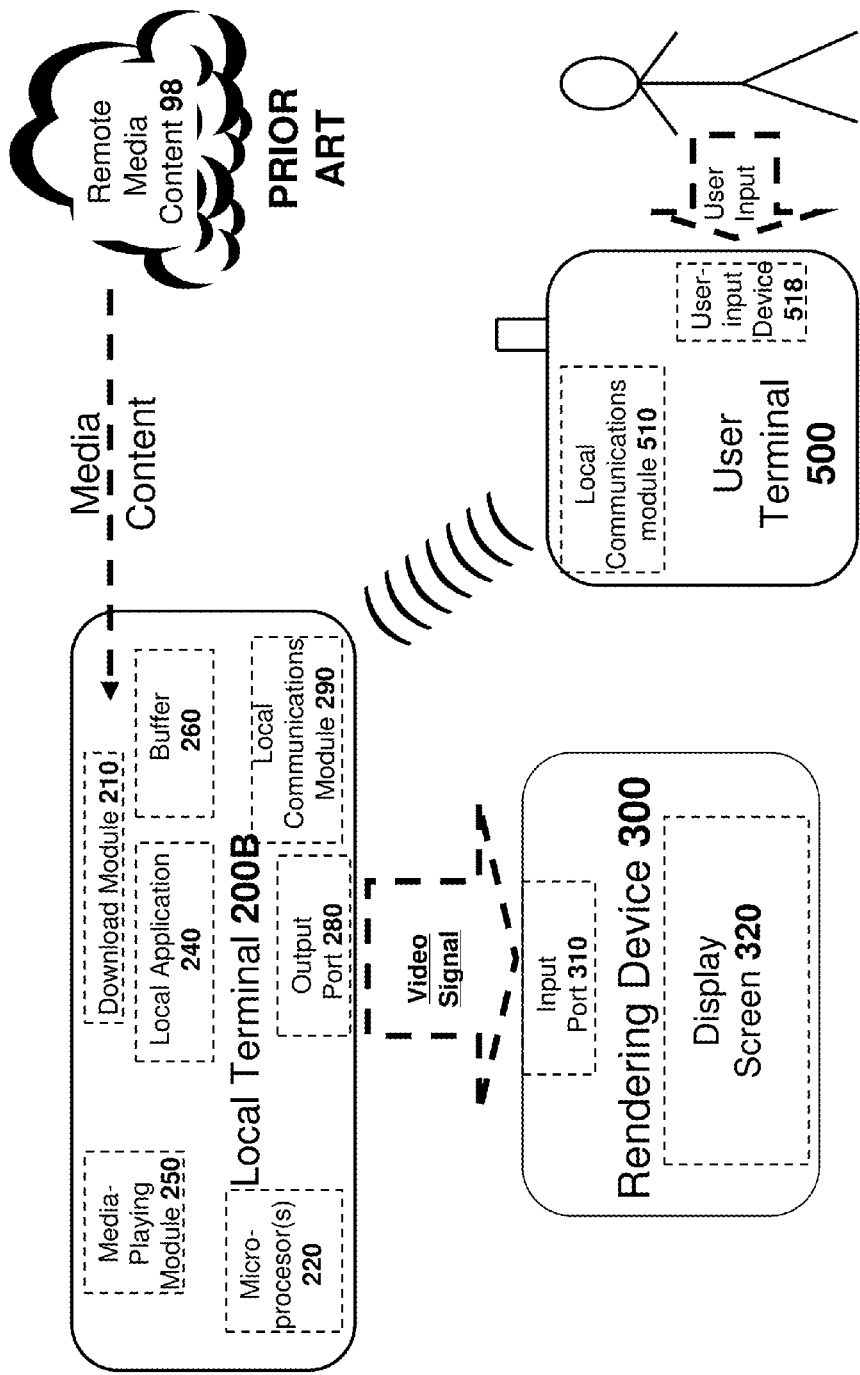

"local terminal"—a digital computer device sharing a common housing with the display screen on which media content is displayed (e.g. see terminal 200A of FIG. 7A) and/or mechanically coupled to a rendering device via respective device ports (e.g. see terminal 200B of FIG. 7B).

"continued presentation"—when referring to video content, 'continued presentation' means that new video frames are continually presented—i.e. the video is not 'stopped' or 'paused.' Thus 'commencing presentation' of video content begins a process where new frames are continuously made visible.

'reducing interference'—it is noted that 'avoiding interference' is a special case of 'reducing interference'.

'display an overlay' (e.g. according to modified attribute(s))—this requires the 'positive act' of display where the overlay is actually visible over the underlying media content.

'remote content'—content that is downloaded into local terminal from a remote location.

FIG. 8 is a flow chart of a method for presenting an overlay on top of media content (e.g. video content) according to some embodiments of the invention.

In step S101, local terminal commences presentation of the underlying media content S101 on the display screen—during the entire time when the method is performed, the underlying media content continues to be displayed on the screen. Thus, the 'large downward block-arrow' on the left side of FIG. 8 refers to continued presentation of media content on the display screen concurrent with all subsequent steps of the method. If the media content is video content, the background media content may evolve in time—e.g. moving locations of ROIs and/or changing an extent of interference between even a stable overlay and the background media content.

After the commencing of the presentation of the video content, the local terminal handles a request for presentation of an overlay by performing the steps S105, S109, S117, and 'conditionally' step S113.

The request for presentation specifies the overlay and a 'target position' (e.g. pixel location within a 2D array of pixels of a frame or static image of underlying media content). In one example, the request for presentation of the overlay is generated at the local terminal—for example, according to user input received via an input device 418 of local terminal 200A and/or via user input received via a user input device 518 of user terminal 500 in local (e.g. wireless) communication with local terminal 200B.

In some embodiments, (A) 'overlay' is locally generated at local terminal 200A or 200B and/or (B) the 'overlay' is not 'available' at the local terminal until after commencing (step S101) of the presentation of the media content. For example, the overlay may be locally generated at local terminal by user commands that are only received at the local terminal after commencing of presentation of the media content.

In another example, the request for local presentation is externally received (e.g. locally or remotely from a remote location) and handled by the local terminal.

As noted above, in some embodiments, the overlay is (i) generated (e.g. by the local terminal) or (ii) is received by the local terminal only after display of the media content has commenced (in step S101) and during the 'continued presentation.' In other embodiments, the overlay is 'pre-generated' (e.g. available at the local terminal before commencing of the display of the media content in step S101) but the request to display the overlay is only generated by the local terminal or is only received by the local terminal after the display of the media content has commenced (step S101).

As noted above, the request to present the overlay specifies (i) the overlay and (ii) a 'target location'

The overlay may be generated by the local terminal or received by the local terminal together with the 'request for presentation'—for example, during the 'continued presentation' after the commencing of step S101. Alternatively, the overlay may be pre-generated before the presentation of media commences in step S101, or generated thereafter and received separately (e.g. from a separate source) from the 'request for presentation.' For example, each overlay may have an associated ID number, and the 'request for presentation' may only include the ID number.

There is no limitation in how the 'target location' is specified as long as the target location is specified. As noted above, the 'target location' may be specified as pixel location within a frame. Alternatively, it may be a 'relative value' relative to the size of the frame—e.g. a fraction between 0 and 1 for the horizontal direction (where '0' is the left side of the frame, '1' is the right side of the frame, and 0.5 is the horizontal center of the frame) and/or a fraction between 0 and 1 for the vertical direction (where '0' is the top of the frame, '1' is the bottom side of the frame, and 0.5 is the vertical center of the frame).

In step S105, the local terminal determines an extent of interference caused by the overlay to the media content. In some embodiments, it is possible to compute a score describing the interference—thus, the interference score for the overlay 130 in Frame 3 of FIG. 2B would be lower than the interference score for the overlay 130 in Frame 3 of FIG. 2A where a 'high score' indicates a high level of interference.

The 'determining of an extent' of interference can include any one or more of the following: (i) computing a 'score' describing the magnitude of the interference; (ii) making a 'binary' determination of "yes interference" vs. "no interference"—for example, the computed magnitude-of-interference score can be compared with a threshold.

In some embodiments, the 'computing of the extent of interference' includes the following: (i) within the underlying media (e.g. video) content, one or more regions of interest are identified (i.e. using any algorithm or combination thereof including but not limited to algorithm(s) disclosed in the prior art documents cited in the 'Background' section); (ii) in accordance with the results of the ROI characterization (e.g. identification, scoring the 'importance' of an ROI, etc) and in according with visual characteristics (e.g. pixel data) of the overlay, the 'extent of interference' is computed.

The computing of the 'extent of 'interference' in step S105 is 'dynamic'—performed by the local terminal, after the commencing of the presentation of the media content in step S101 and during the 'continued' presentation thereof.

As noted above, the 'extent of the interference' may be determined according to boundaries of ROI(s) of the underlying media content and/or any other property of the underlying media content. This characterization of the boundary(ies) of the ROI(s) and/or any other property thereof may be performed either at the local terminal or external to the local terminal—e.g. at a remote location 'in the cloud' in communication with the local terminal via the Internet.

Thus, in one example, for each video frame, data descriptive of the ROI (i.e. boundary(ies) and/or other property(ies)) may be received together with the video frame as 'meta-data' of the video frame.

Even if the characterization of the region of interest is performed remotely, as long as the final determination of the 'extent of interference' is performed by the local terminal, after the commencing of the presentation, and during the 'continued presentation,' this determination of the extent of interference is considered to be a 'dynamic determination.'

In one example, all of the following are performed at the local terminal after the commencing of the presentation, and during the 'continued presentation,': (I) characterizing the ROI(s) within each video frame; (II) comparing pixels (e.g. color-values such as RGB vales) of each frame of underlying video frame with pixels of the overlay; and (III) according to the characterizing of the ROI(s) and according to the comparing of the pixels completing a determination of an 'extent of interference.'

In another example, (I) is performed outside (e.g. remote to) the local terminal (for example, the characteristic(s) of ROI(s) may be received by the local terminal as 'meta-data), but (II) and (III) are performed at the local terminal after the commencing of the presentation, and during the 'continued presentation.

If the extent of interference exceeds a threshold (step S109) then a modified overlay is displayed in step S117 instead of the original overlay. Conversely, if the extent of interference is below the threshold (step S109) then the original, unmodified overlay is displayed in step S117.

The modification of the overlay may be computed, in step S113, so as to modify the size and/or shape and/or transparence and/or color of the overlay. For example, the modification may be computed so as to reduce and/or eliminate the interference—see, for example, the 'four examples' discussed above and the discussions below with reference to FIGS. 9-15.

Figure 1B:
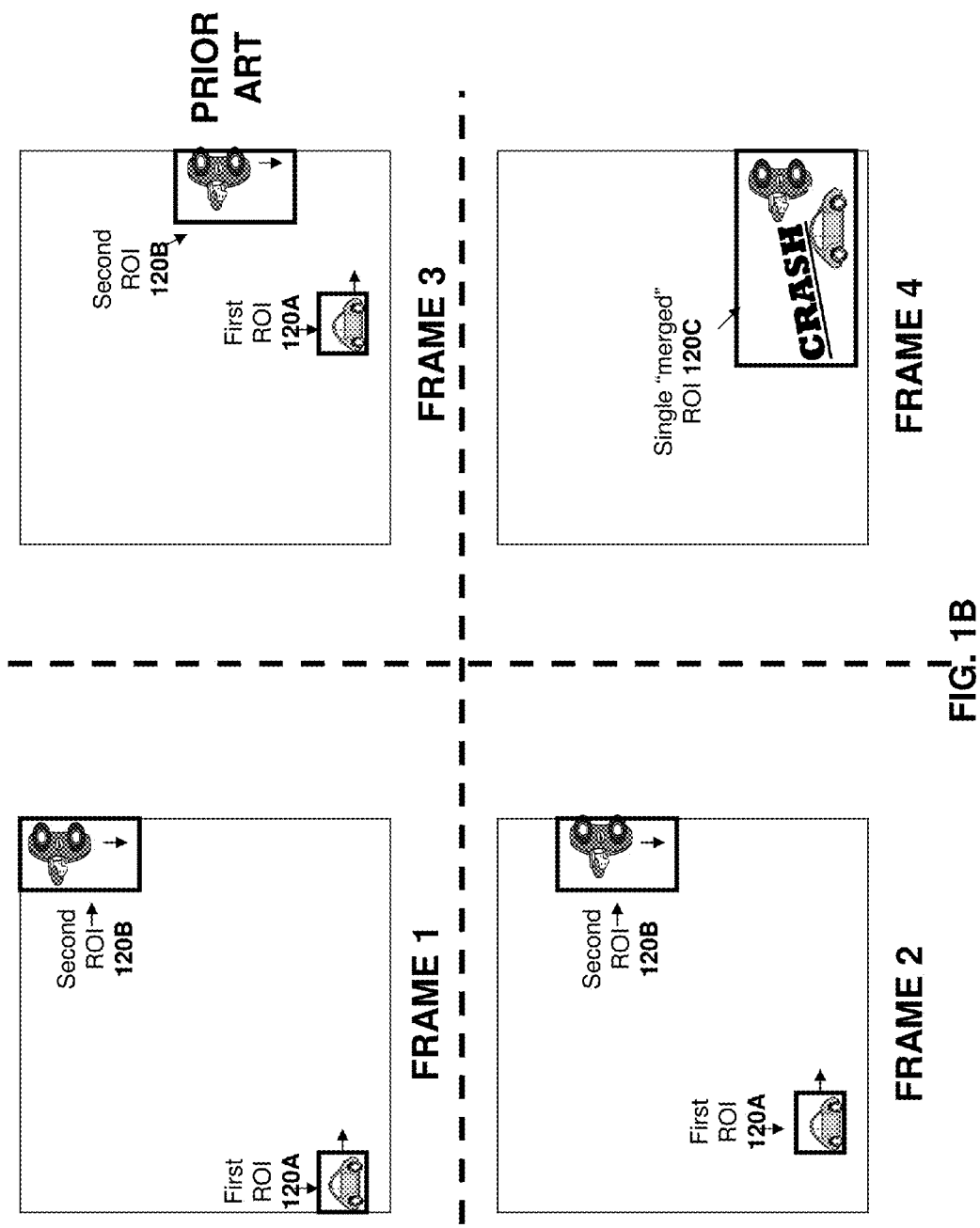
Figure 2A:
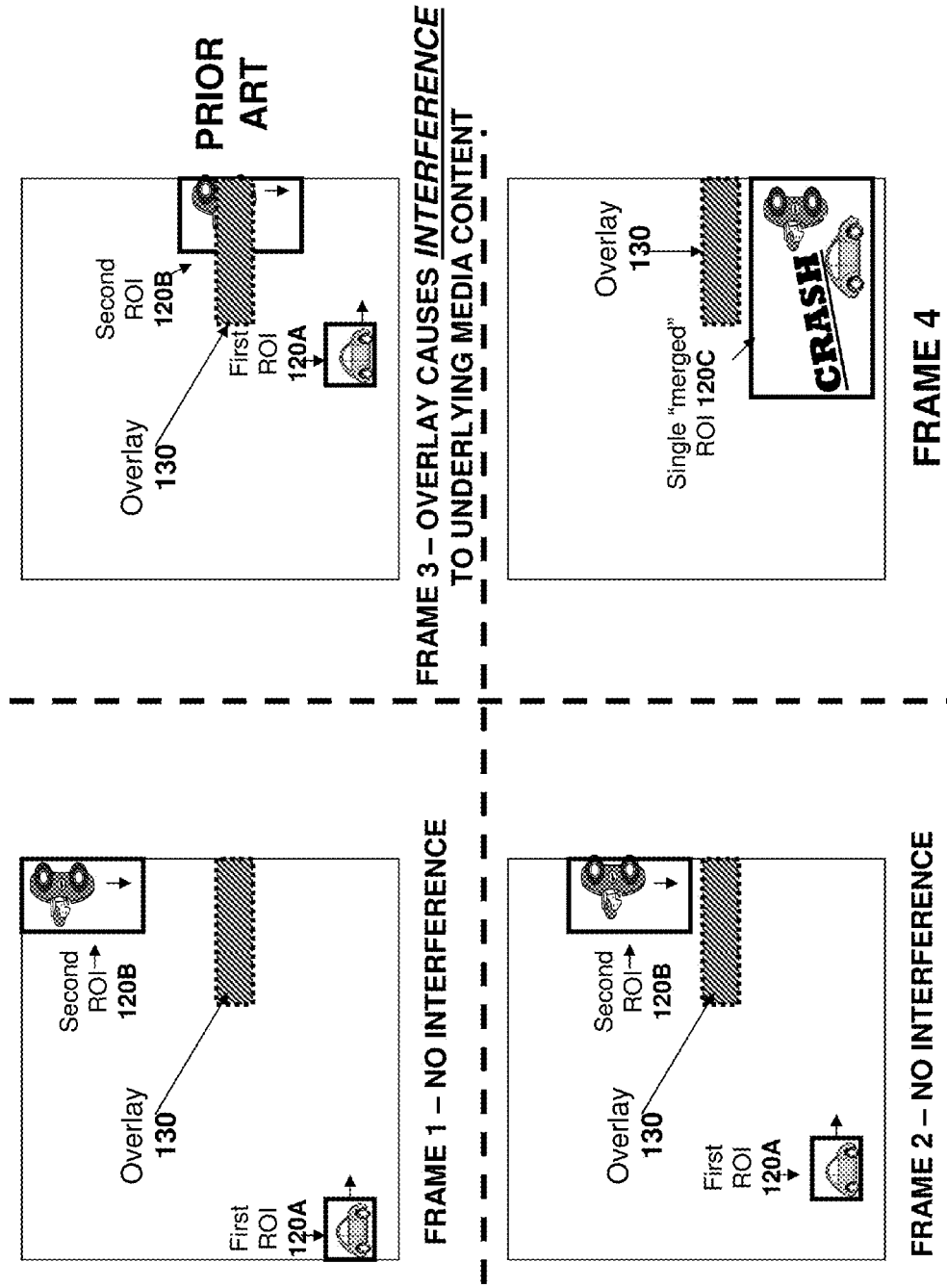

The example of FIG. 9A relates to how steps S101-S117 may be performed for the video frame-sequence of FIG. 2A. In Frame 3 overlay 130 is modified (steps S113 and S117) by increasing it's transparency to a 90% transparency so as to reduce the interference.

Figure 3:
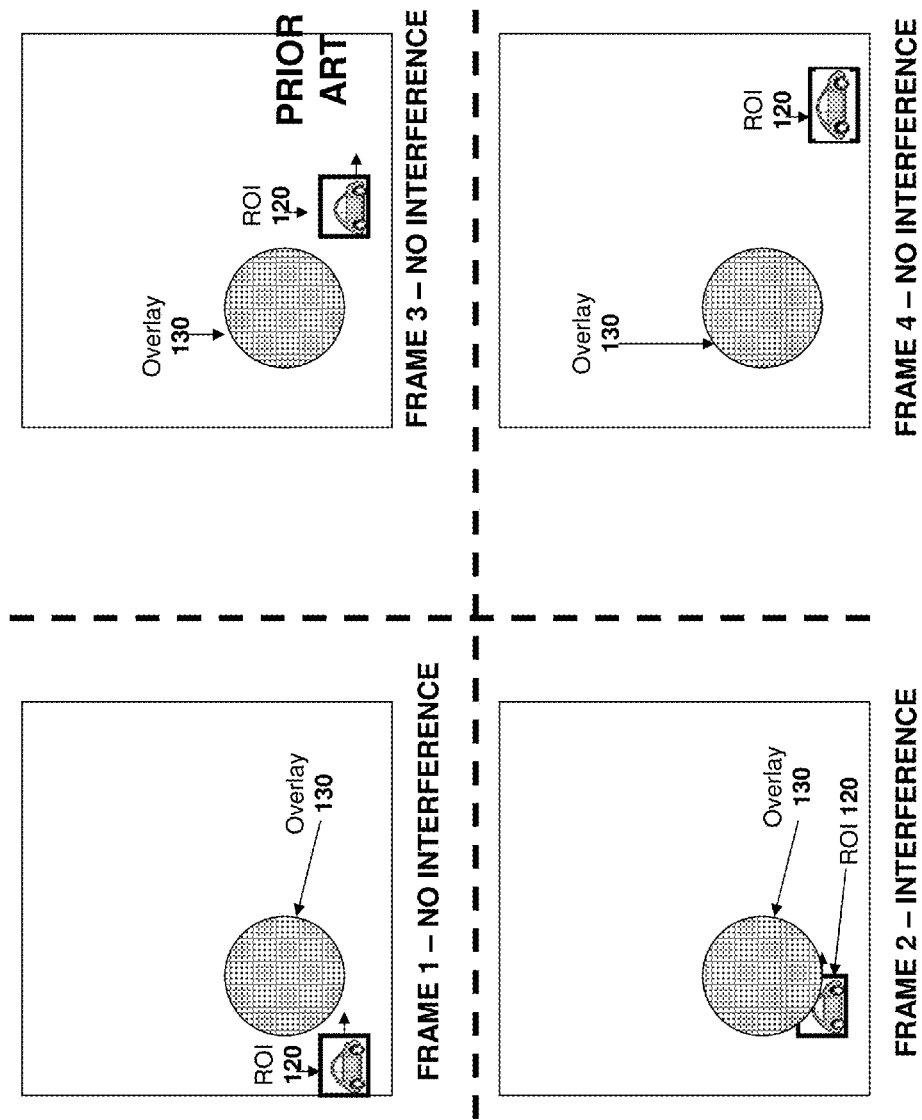

The example of FIG. 9B relates to how steps S101-S117 may be performed for the video frame-sequence of FIG. 3. In Frame 2 overlay 130 is modified (steps S113 and S117) by decreasing it's size (e.g. without moving a centroid of the overlay)—e.g. so as to reduce the interference.

The example of FIG. 9C relates to how steps S101-S117 may be performed for the video frame-sequence of FIG. 3. In Frame 2 overlay 130 is modified (steps S113 and S117) to change it's shape (e.g. while preserving it's area and/or without moving a centroid of the overlay)—e.g. so as to reduce the interference.

The example of FIG. 9D relates to how steps S101-S117 may be performed for the video frame-sequence of FIG. 4B. In Frames 2-3 overlay 130 is modified (steps S113 and S117) to change it's color to increase a color-contrast between overlay 130 and pixels of the underlying media content within the ROI 120. In one example, the change of color 'darkens' overlay 130 (see FIG. 9D). In one example, the change of color lightens overlay 130.

The example of FIG. 10 relates to the video frame-sequence of FIG. 2A, and (similar to the example of FIG. 9A) in the example of FIG. 10 interference is reduced by increasing a transparency of the overlay. In the example of FIG. 9A, the modification of the overlay is applied 'in advance'—i.e. before Frame 3 is displayed and before overlay 130 causes interference to the underlying media in ROI 120B. In the example of FIG. 10, when interference starts the original overlay is first displayed (i.e. in its unmodified form) in Frame 2 and then, within the frame range in which interference exists, it is 'corrected' so that subsequently the modified overlay is displayed (instead of the original overlay) over the video content (in this case over Frame 3).

Figure 11:
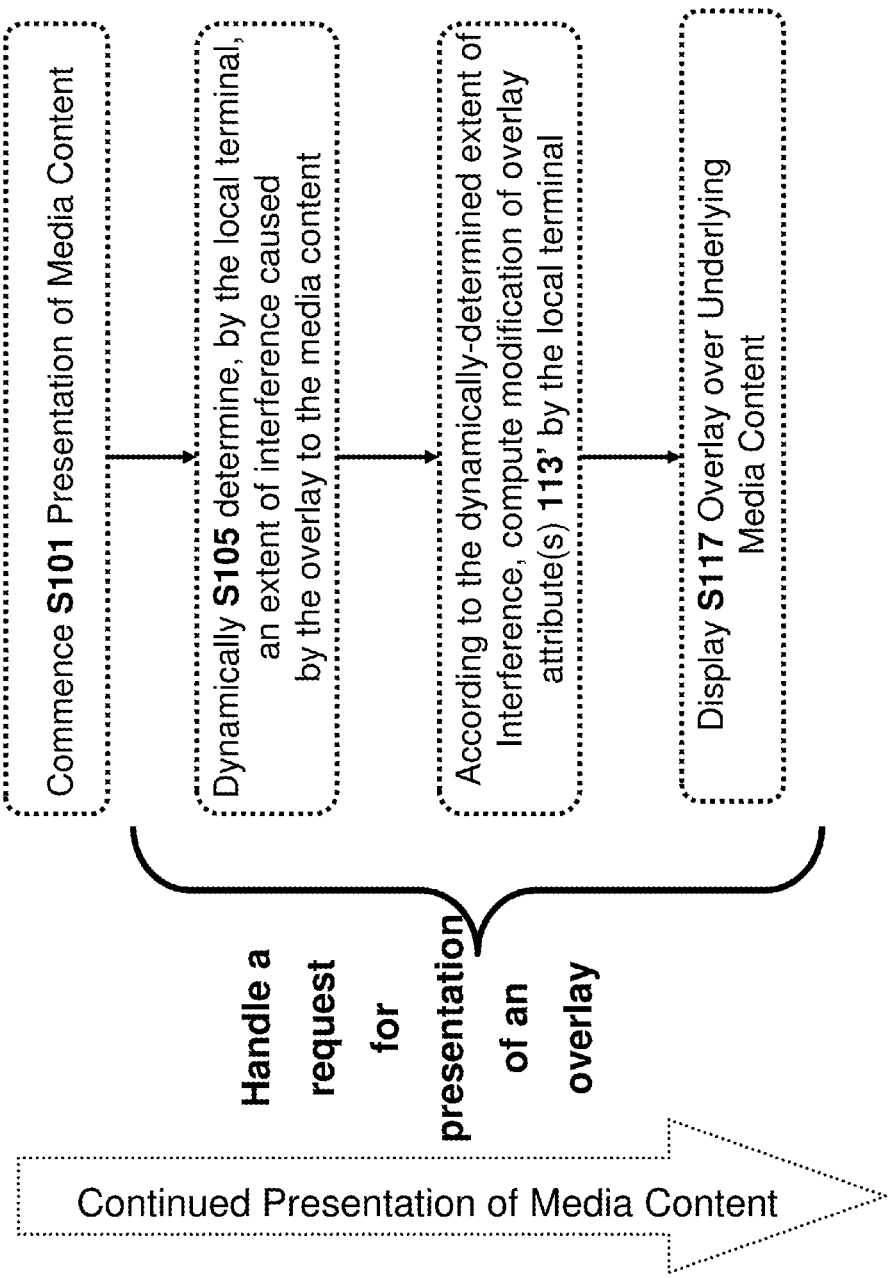

FIG. 11 is flow chart of a method for presenting an overlay over underlying media content—the method of FIG. 8 is a special case of the method of FIG. 11. In step 113' the overlay modification is computed according to the determined extent of interference.

In some embodiments, the amount of interference may be quantified and/or given a score. In situations of 'greater interference' a greater modification is applied to the overlay, and in situations of 'lesser interference' a lesser modification.

Reference is made once again to FIGS. 2A-2B. As noted above, in FIG. 2A the 'extent of interference' caused by the overlay 130 (i.e. in Frame 3 of FIG. 2A) to the underlying media content exceeds the 'extent of interference' caused by the overlay 130 of FIG. 2B (i.e. in Frame 3 of FIG. 2B) to the underlying media content. FIG. 9A illustrates (according to one example) modification of the overlay 130 of FIG. 2A to reduce interference caused by overlay 130 to underlying video of frame-sequence of FIG. 2A (in particular Frame 3). FIG. 12 illustrates (according to one example) modification of the overlay 130 of FIG. 2B to reduce interference caused by overlay 130 to underlying video of frame-sequence of FIG. 2B (in particular Frame 3).

Comparison of FIG. 12 to FIG. 9A indicates that the extent of modification (step S113' of FIG. 11) to the overlay 130 in Frame 3 of FIG. 9A exceeds the extent of modification (step S113' of FIG. 11) to the overlay 130 in Frame 3 of FIG. 12. This is because the 'extent of interference' caused by the overlay 130 (i.e. in Frame 3 of FIG. 2A) to the underlying media content exceeds the 'extent of interference' caused by the overlay 130 of FIG. 2B (i.e. in Frame 3 of FIG. 2B) to the underlying media content.

It is now disclosed that there are situations where modifying the attribute(s) of the overlay is not a desirable goal in-and-of-itself and the overlay attribute(s) is(are) modified only as much as required to 'avoid' interference or to reduce it below some sort of threshold/tolerance. Thus, in the example of FIG. 12 (Frame 3) increasing the transparency to 90% (i.e. the modification of FIG. 2B) also would have served to avoid the interference at least as well as the increase of the transparency to 60%. However, the 'price' paid would have been a greater modification of the overlay attribute.

Thus, in some embodiments, the modification of the overlay attribute(s) is performed so as to minimize the change to the overlay for an acceptable level of interference. This concept was explained (FIGS. 9A and 12—because the interference in FIG. 2B is less than the interference in FIG. 2A, it is decided to only assign a transparency value of 60% to the overlay in FIG. 12 Frame 3) with respect to the 'transparency' attribute but it is appreciated that this also applies to any other overlay attribute including size, shape and color (i.e. the 'degree of change' in color may also be quantified—e.g. according to a distance in RGB 3-dimensional space between the original unmodified overlay and the overlay whose color has been modified).

Factors that indicate a 'greater extent' of interference include but are not limited to: (i) a greater fraction of a region being occupied by the overlay; and (ii) a lesser color-contrast between the overlay and pixels of the underlying media within a region of interest.

Figure 13:
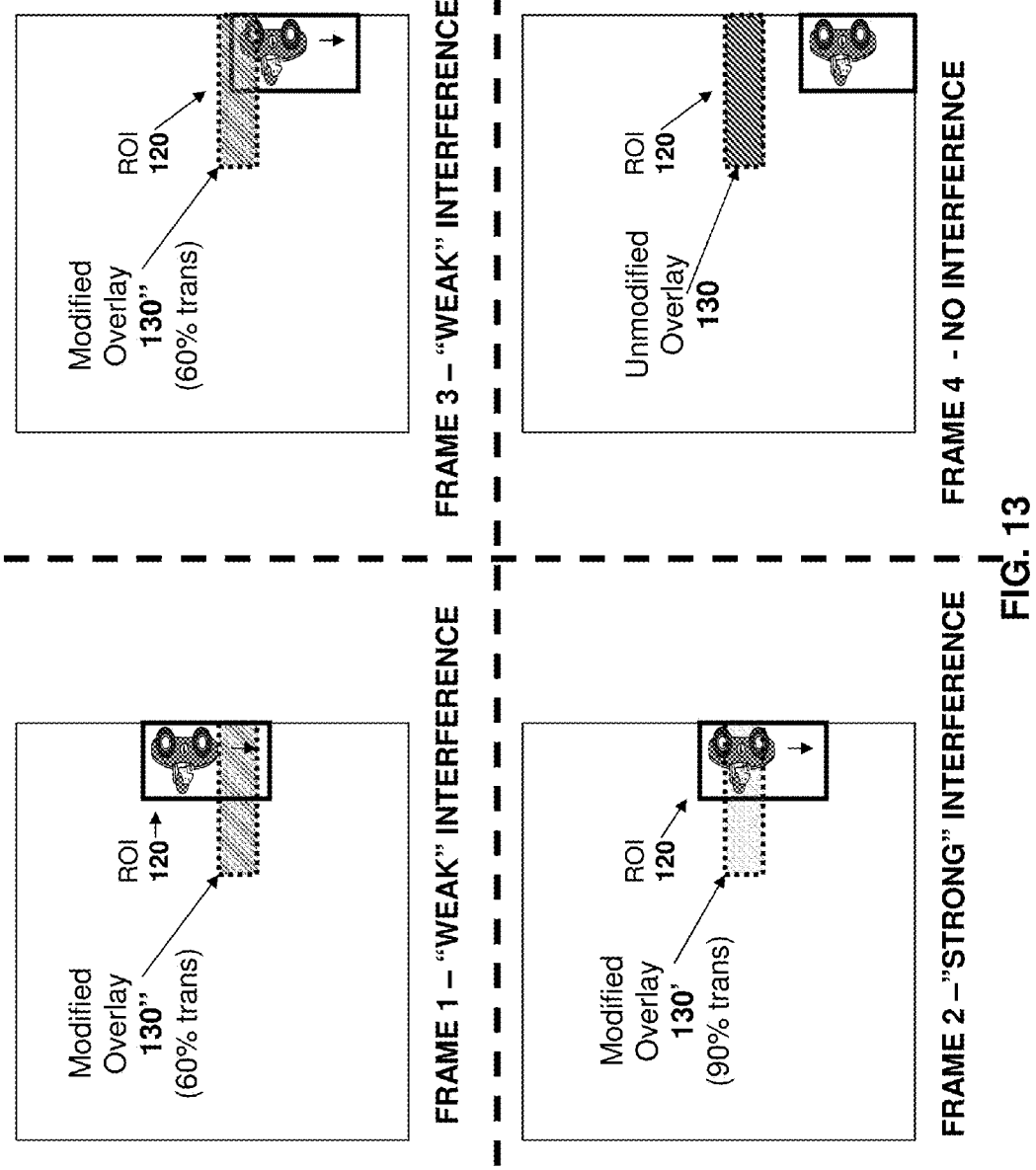
Figure 14:
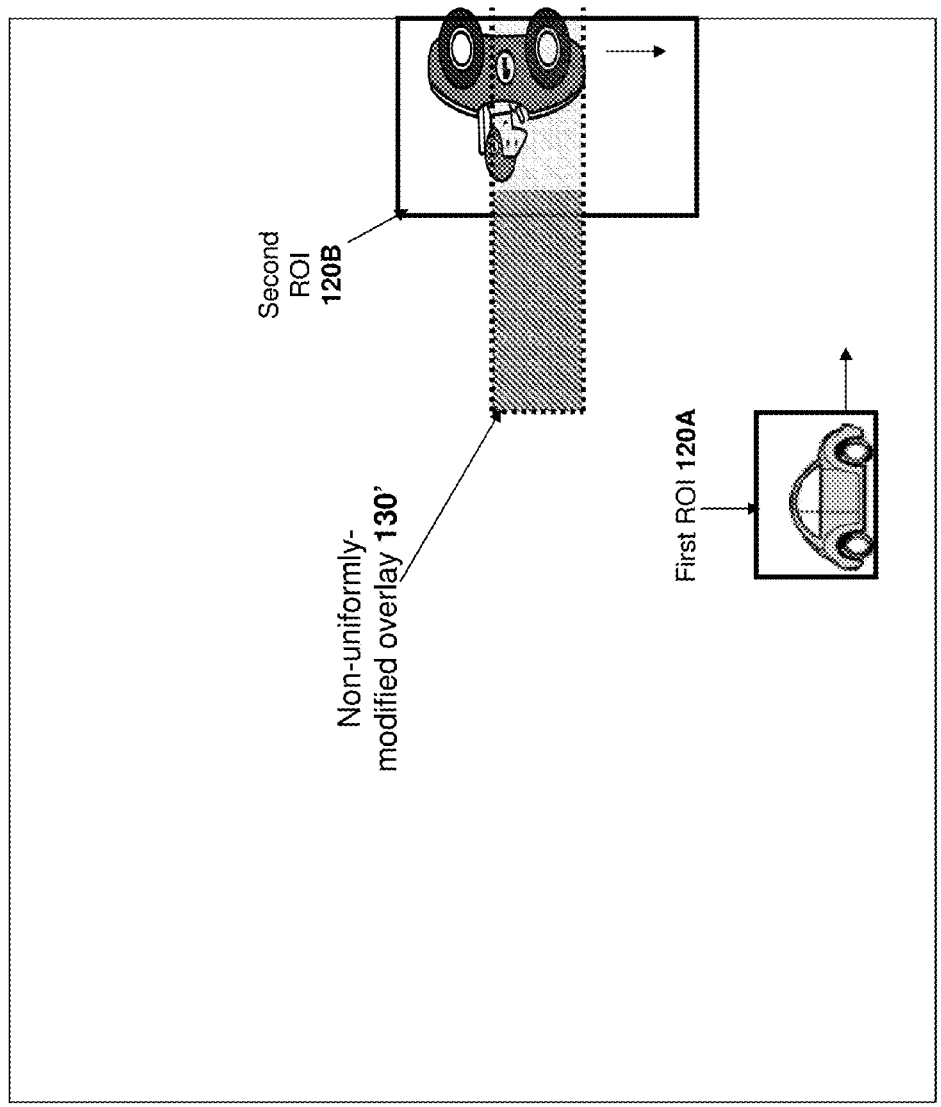

Referring to FIG. 13, it is noted that this also may be performed dynamically within frames of a video content. FIG. 13 relates to the example of FIG. 5—in FIG. 13 the degree of modification to overlay attribute(s) (e.g. transparency) is increased and decreased in response to increasing or decreasing amounts of interference caused by the overlay to the underlying video content.

Thus, in Frame 1, the interference is 'weak' and the overlay is modified by imposing a transparency of 60%. In Frame 2, the amount of interference increases compared to Frame 1, and the degree of modification of overlay attribute(s) increases (e.g. by increasing the transparency from 60% to 90%). In Frame 3, the amount of interference decreases compared to Frame 2, and the degree of modification of overlay attribute(s) decreases (e.g. by decreasing the transparency from 90% to 60%). In Frame 4, the amount of interference decreases compared to Frame 3, and the degree of modification of overlay attribute(s) decreases (e.g. by decreasing the transparency from 60% to 'no transparency imposed').

A method of displaying an overlay on top of video content comprises: a. commencing presentation of video content on a display screen associated with a local terminal; and b. subsequently and during the continued presentation of the video content: i. performing a first display operation by displaying the overlay on top of the underlying video content at an earlier time (e.g. the display of overlay 130 at 60% transparency in Frame 1 of FIG. 13); ii. dynamically analyzing content of each given frame of a set of frames of the video to dynamically detect or predict, for each given frame, a respective extent of interference caused by the overlay to the given frame; and iii. responding to an actual or predicted temporal change in the extent of interference (e.g. between Frames 1 and 2, the extent of interference increases due to movement of the car) attributable to the evolving of the underlying video content in time (e.g. due to movement of the car) by: A. computing a modification of at least one overlay attribute of the overlay (i.e. transparency); and B. performing a second display operation, at a later time (e.g. the display of overlay 130 at 90% transparency in Frame 2 of FIG. 13), by displaying the overlay on top of the video content by the local terminal such that the overlay is modified according to the computed modification.

Thus, in FIG. 13, in response to an 'increase in interference' (from Frame 1 to Frame 2) the overlay is modified to increase the transparency. In response to a 'decrease in interference' (from Frame 2 to Frame 3), the overlay is modified to decrease the transparency. Other examples may relate to size attributes (i.e. where the size is decreased in response to increased interference) and/or shape attributes and/or color attributes.

As noted above, two examples of attributes that may be modified are color (see FIG. 9D) and transparency (see FIG. 9A). In these cases, the overlay is subject to a 'color-transformation' (e.g. a darkening or lightening-function or any other 'color-transformation') and/or a transparency-modification. Such color-modification and/or transparency-modification is not required to be applied uniformly—in the example of FIG. 14 the transparency-modification is non-uniform where on the right hand portion of the overlay, the transparency is increased to a greater extent than on the left hand portion of the overlay.

As noted above (FIG. 6), in some examples an underlying media item may have more than one 'region of interest.' In FIG. 6, a first overlay 130A causes interference to a first ROI 120A, and a second overlay 130B causes interference to a second ROI 120B.

Figure 6:
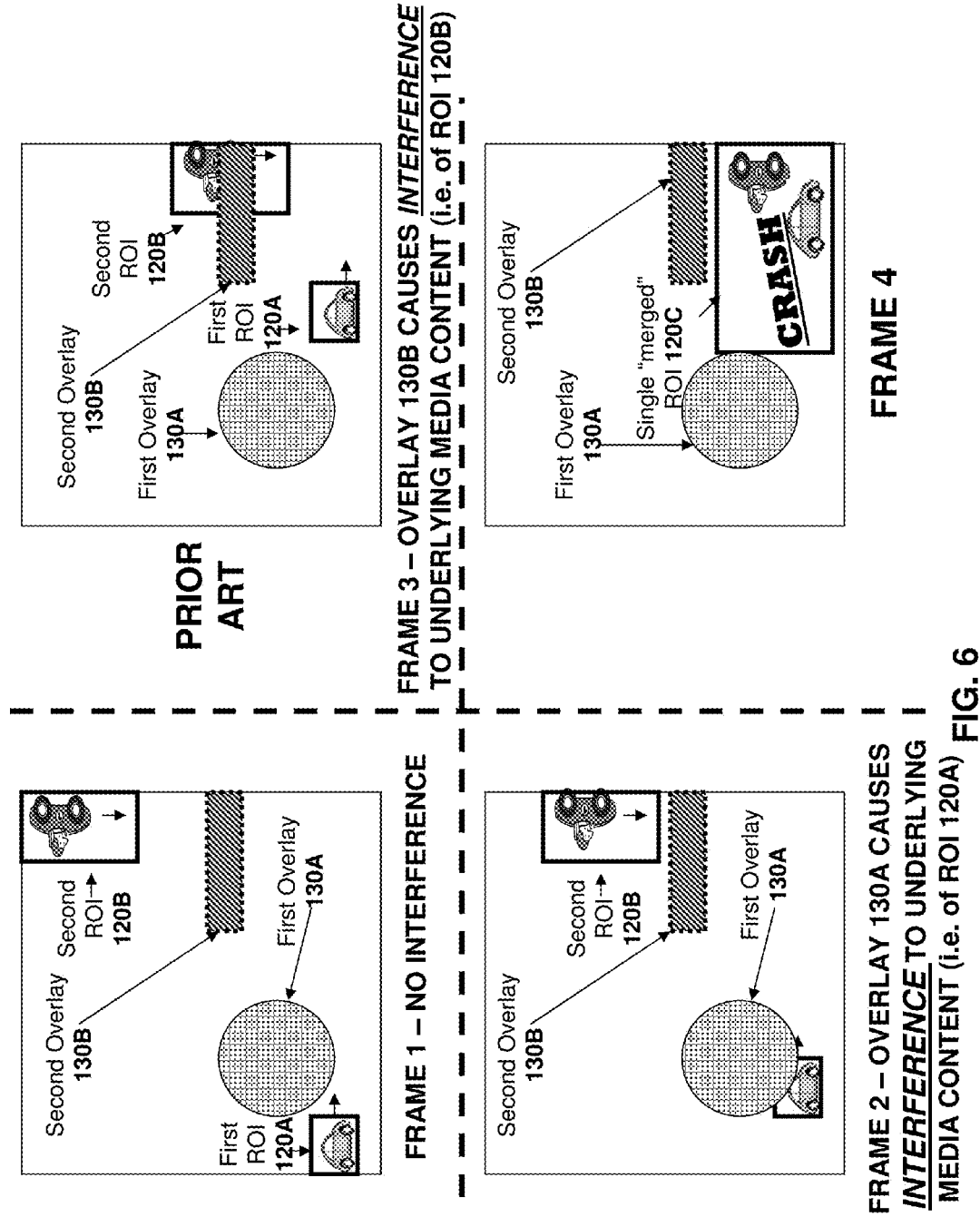
Figure 15:
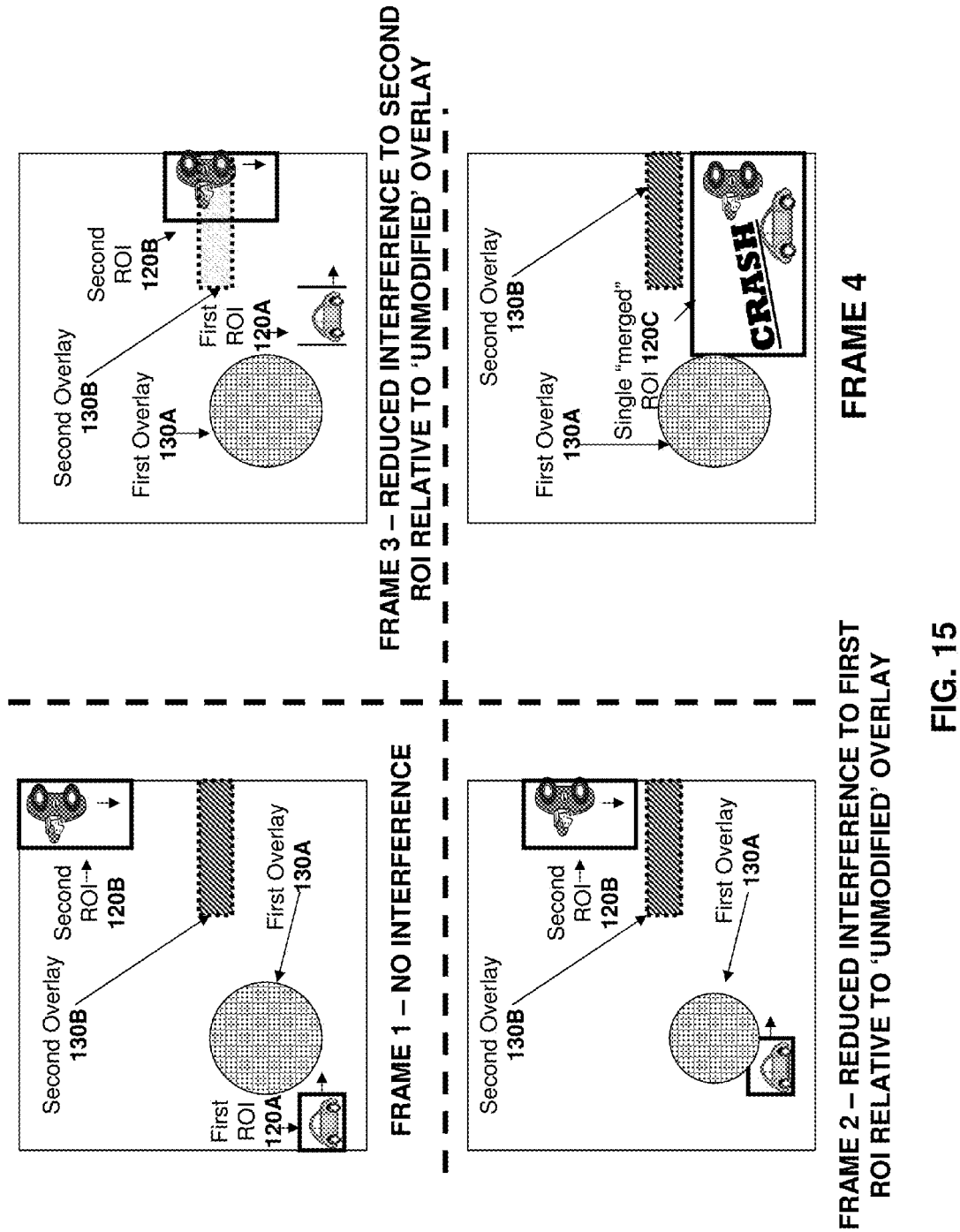

FIG. 15 relates to the example of FIG. 6 where different respective transformations of overlay attribute(s) are computed to two non-contiguous overlays 130A, 130B having different centroids (and optionally different sizes and/or shapes) that are simultaneously displayed over underlying media (e.g. video) content. In the non-limiting example of FIG. 15, (A) in order to reduce the interference caused by the first overlay 130A to the first ROI 120A, the size of first overlay 130A is reduced in Frame 2 (i.e. in response to increasing interference between Frame 1 and Frame 2).; (B)) in order to reduce the interference caused by the second overlay 130B to the second ROI 120B, the transparency of the second overlay 130B is increased in Frame 3 (i.e. in response to increasing interference between Frame 2 and Frame 3).

Thus, between Frames 1 and 2 the size of first overlay 130A is reduced while the size of the second overlay 130B is maintained. Between Frames 2 and 3 the following transformations are applied: (i) first overlay 130A increases in size in response to a decrease in the extent of interference caused by first overlay 130A to the underlying media content and (ii) a transparency of second overlay 130B increases in response to an increases in the extent of interference caused by second overlay 130B to the underlying media content.

Figure 16A:
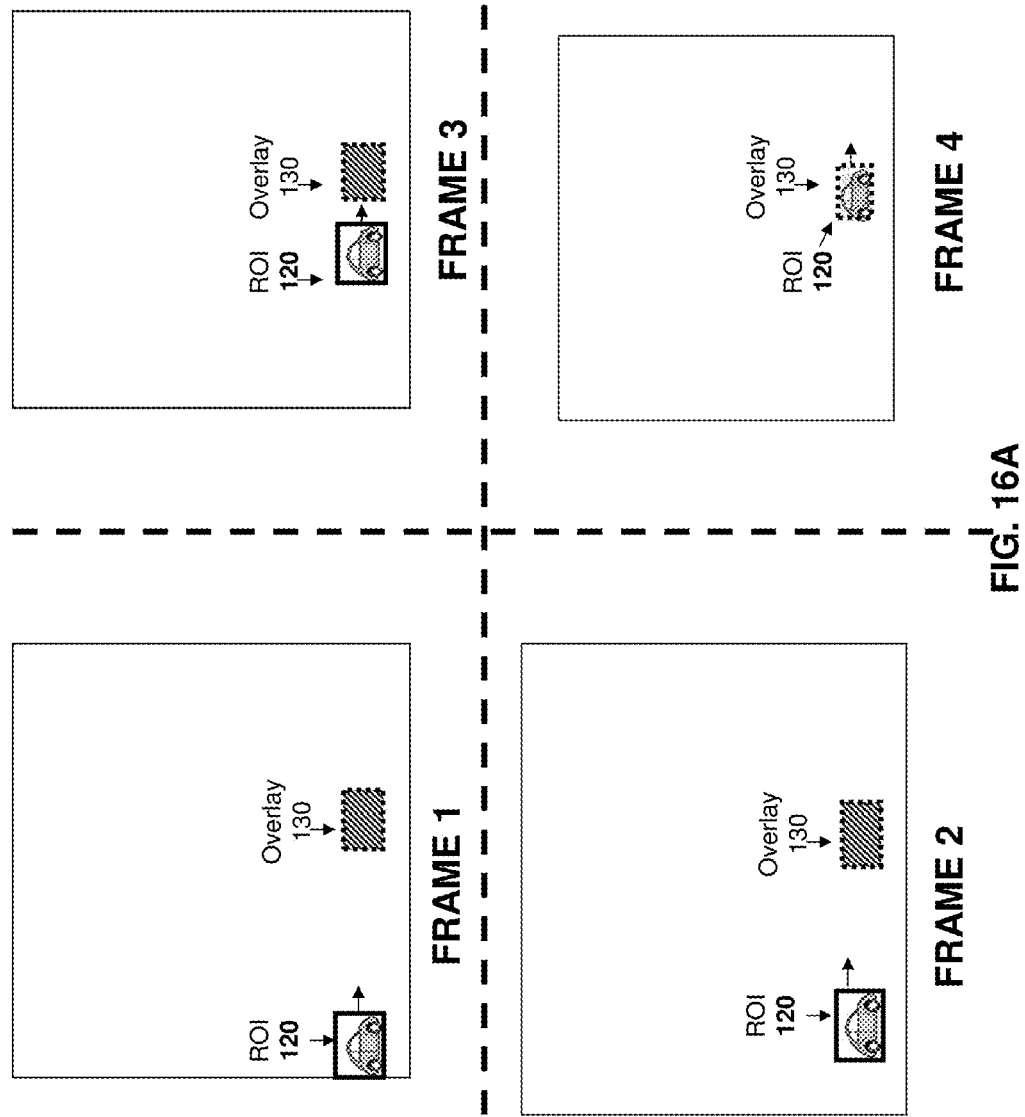

FIGS. 16A and 16B refer to additional embodiments. In the example of FIG. 16A, there is no interference in Frames 1-3—as such, in Frames 1-3 the transparency of overlay 130 is 0%; interference in Frame 4 is handled by modifying overlay 130 so that it's transparency increases to 90%.

In contrast, in FIG. 16B, instead of 'suddenly spiking' the transparency from 0% to 90%, it is possible to provide a smoother transition. In Frame 2 of FIG. 16B, the transparency is 30% (as opposed to 0% in Frame 2 of FIG. 16A). In Frame 3 of FIG. 16B, the transparency is 70% (as opposed to 0% in Frame 3 of FIG. 16A). In Frame 4 of FIG. 16A and in Frame 4 of FIG. 16B, the transparency is 90%. Thus, the example of FIG. 16B provides a solution to the 'spiking problem' visible in FIG. 16A. The example of FIG. 16B provides the following features—even though there is no interference in Frame 2 of FIG. 16B, in anticipation of the future interference in Frame 4 (and in order to provide a 'smoother transition'), overlay 130 is modified in Frame 2 to provide an increased transparency. Alternatively or additionally, the size may be modified (e.g. to make the overlay smaller) or the color may be modified or the shape may be modified. In all of these examples, the extent of the modification may be determined either by current interference or by future interference—e.g. in order to provide a smoother transition, 'intermediate modifications' are computed and displayed.

In different use-cases related to 'video content', the frame rate may be at least 20 Hz or at least 25 Hz at least 50 Hz or at least 100 Hz.

Algorithms for identifying region(s) of interest (ROI(s)) and/or detecting an extent of interference are known in the art—any algorithm or combination thereof may be used. Without limitation, and by way of example, any algorithm or combination of algorithm(s) disclosed in any of the following documents (i.e. each document individually, or taken together) may be employed: U.S. Pat. Nos. 5,953,076, 7,015,978, 8,369,686, 8,451,380, US20110188836 US20110178854, US20110012812, US2013227622 and WO2001072040. As noted above, each of these documents are incorporated by reference.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of displaying an overlay on top of video content, the method comprising:
   a. commencing presentation of video content on a display screen associated with a local terminal; and
   b. subsequently and during the continued presentation of the video content, handling a request for presentation of an overlay on top of the video content at a target position on the display screen by performing the following steps:
      i. subsequent to the local terminal receiving and/or generating the request to present the overlay and in accordance with the target position, dynamically determining, by the local terminal, an extent of color interference caused by the overlay to the video content;

ii. in accordance with the determined extent of color interference, computing, by the local terminal, a modification of the overlay that darkens the overlay or a portion thereof so as to increase a color-contrast between the overlay and the video content; and iii. displaying the overlay on top of the video content by the local terminal, wherein the overlay is modified according to the computed modification.

2. A method of displaying an overlay on top of video content, the method comprising:

a. commencing presentation of video content on a display screen associated with a local terminal; and b. subsequently and during the continued presentation of the video content, handling a request for presentation of an overlay on top of the video content at a target position on the display screen by performing the following steps:

i. subsequent to the local terminal receiving and/or generating the request to present the overlay and in accordance with the target position, dynamically determining, by the local terminal, an extent of interference caused by the overlay to the video content;

ii. in accordance with the determined extent of interference, computing , by the local terminal, a shape-modification of the overlay that changes an aspect ratio thereof; and iii. displaying the overlay on top of the video content by the local terminal, wherein the overlay is modified according to the computed modification.

3. The method of claim 2 wherein the shape modification transforms between vertical strip of user-interface controls and a horizontal strip of the same user-interface controls.

4. The method of claim 2 wherein the dynamic determining is performed by the local terminal in response to the request to present the overlay.

5. The method of claim 2, wherein the request to present the overlay is locally generated at the local terminal.

6. The method of claim 2, wherein the request to present the overlay is remotely received by the local terminal from a remote computer.

7. The method of claim 2, wherein the determining of the extent of the interference comprises determining whether the extent of the interference requires the modification of the at least one overlay attribute.

8. The method of claim 2 wherein the video content is remote content and the commencing of the presentation occurs when the video content is only partially downloaded to the local terminal.

9. The method of claim 2 wherein the video content is remote content and the overlay is locally generated at the local terminal.

10. The method of claim 2 wherein the video content is remote content and the overlay is remotely generated and downloaded to the local terminal.

11. The method of claim 2 wherein the video content is remote content, further comprising:

c. subsequent to the displaying of the overlay according to the computed modification, downloading additional frames of the video content to the local terminal;

d. in response to the downloading of the additional frames and in accordance with the target position, dynamically determining, by the local terminal, a second extent of interference caused by the overlay to the additional frames of the video content;

e. in accordance with the second determined extent of interference, computing , by the local terminal, a second modification of at least one overlay attribute of the overlay, said second modification being different from the first modification; and f. displaying the overlay on top of the video content by the local terminal, wherein the overlay is modified according to the second computed modification.

12. The method of claim 2 wherein an interference caused by the modified overlay to the video content is less than the interference caused by the unmodified overlay to the video content.

13. The method of claim 2 wherein a different respective modification is respectively made to the displayed overlay for each frame of a plurality of video frames of the video content.

14. The method of claim 2 wherein in response to a user dragging the overlay over the underlying media content, a modification of the overlay is computed and applied to the overlay.

15. The method of claim 2, further comprising periodically refreshing the modification to the overlay attribute according to changes in the media content.

16. A method of displaying an overlay on top of video content, the method comprising:

a. commencing presentation of video content on a display screen associated with a local terminal; and b. subsequently and during the continued presentation of the video content, handling a request for presentation of an overlay on top of the video content at a target position on the display screen by performing the following steps:

i. subsequent to the local terminal receiving and/or generating the request to present the overlay and in accordance with the target position, dynamically determining, by the local terminal, an extent of interference caused by the overlay to the video content;

ii. in accordance with the determined extent of interference, computing , by the local terminal, a shape-modification of the overlay; and iii. displaying the overlay on top of the video content by the local terminal, wherein the overlay is modified according to the computed shape-modification and wherein:

A. the shape-modification modifies a shape of the overlay while preserving its area; and/or B. the shape-modification transforms a shape of the overlay between a curved form and a polygonal form; and/or C. the shape-modification transforms a shape of a portion of an enclosing boundary of the overlay between curved and straight.

17. The method of claim 16 wherein the shape-modification modifies a shape of the overlay while preserving its area.

18. The method of claim 16 wherein the shape-modification transforms the shape of the overlay between the curved form and the polygonal form.

19. The method of claim 18 wherein the shape-modification transforms the shape of the overlay from the curved form to the polygonal form.

20. The method of claim 16 wherein the shape-modification transforms the shape of the portion of the enclosing boundary of the overlay between curved and straight.

21. The method of claim 20 wherein the shape-modification transforms the shape of the portion of the enclosing boundary of the overlay from curved to straight.

22. A method of displaying an overlay on top of video content, the method comprising:
   a. commencing presentation of video content on a display screen associated with a local terminal; and
   b. subsequently and during the continued presentation of the video content, handling a request for presentation of an overlay on top of the video content at a target position on the display screen by performing the following steps:
      i. subsequent to the local terminal receiving and/or generating the request to present the overlay and in accordance with the target position, dynamically determining, by the local terminal, an extent of interference caused by the overlay to the video content;
      ii. in accordance with the determined extent of interference, computing, by the local terminal, a modification that non-uniformly modifies at least one overlay attribute of the overlay such that textual portion(s) of the overlay are modified in a different manner than non-textual portion(s) of the overlay; and
      iii. displaying the overlay on top of the video content by the local terminal, wherein the overlay is modified according to the computed modification.

23. A method of displaying an overlay on top of video content comprising a temporally-ordered sequence of video-frames where a first video-frame of the sequence precedes a second video frame of the sequence, the method comprising:
   a. commencing presentation of the video content on a display screen associated with a local terminal; and
   b. subsequently and during the continued presentation of the video content, handling a request for presentation of an overlay on top of the video content at a target position on the display screen by performing the following steps:
      i. subsequent to the local terminal receiving and/or generating the request to present the overlay and in accordance with the target position, dynamically determining, by the local terminal, a second-frame-specific extent of interference (EOI) predicted to be caused by the overlay to the second video-frame of the temporally-ordered sequence; ;
      ii. in accordance with and in response to the dynamically-determined second-video-specific EOI , subjecting the overlay to a staged transition such that:
         A. the local terminal computes first-frame-specific and second-frame-specific modifications of the overlay where the second-frame-specific modification changes the overlay to a greater extent than the first-frame-specific modification;
         B. during display of the first video frame of the video frame sequence, the local terminal displays the overlay over the first video frame according to the first-frame-specific modification; and
         C. subsequently and during display of the second video frame of the video frame sequence, the local terminal displays the overlay over the second video frame according to the second-frame-specific modification.

24. The method of claim 23 wherein there is no interference between an unmodified version of the overlay and the first video frame of the video frame sequence.

25. The method of claim 23 wherein an EOI caused by an unmodified version of the overlay to the second video frame of the temporally-ordered sequence of video-frames exceeds an EOI caused by the unmodified version of the overlay to the first video frame of the temporally-ordered sequence of video frames.

* * * * *